US 8,620,094 B2

(12) United States Patent
Takenouchi et al.

(10) Patent No.: US 8,620,094 B2
(45) Date of Patent: Dec. 31, 2013

(54) PATTERN RECOGNITION APPARATUS, PATTERN RECOGNTION METHOD, IMAGE PROCESSING APPARATUS, AND IMAGE PROCESSING METHOD

(71) Applicant: Panasonic Corporation, Osaka (JP)

(72) Inventors: Mariko Takenouchi, Osaka (JP); Saki Takakura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/715,166

(22) Filed: Dec. 14, 2012

(65) Prior Publication Data

US 2013/0129219 A1 May 23, 2013

Related U.S. Application Data

(62) Division of application No. 12/601,989, filed as application No. PCT/JP2009/001981 on Apr. 30, 2009, now Pat. No. 8,509,571.

(30) Foreign Application Priority Data

Jun. 11, 2008 (JP) .................................. 2008-152749
Jul. 11, 2008 (JP) .................................. 2008-181733

(51) Int. Cl.
*G06K 9/62* (2006.01)
(52) U.S. Cl.
USPC .......................................... 382/218; 382/309
(58) Field of Classification Search
USPC ................... 382/104, 105, 209, 217, 218, 309
See application file for complete search history.

(56) References Cited

U.S. PATENT DOCUMENTS

| 2005/0169502 A1 | 8/2005 | Takahashi et al. ............ 382/105 |
| 2006/0017562 A1 | 1/2006 | Bachelder ..................... 340/531 |
| 2010/0172580 A1 | 7/2010 | Takenouchi et al. .......... 382/165 |

FOREIGN PATENT DOCUMENTS

| JP | 07-129713 A | 5/1995 | .............. G06K 9/03 |
| JP | 07-272189 A | 10/1995 | .............. G08G 1/04 |
| JP | 09-081689 A | 3/1997 | .............. G06K 9/62 |
| JP | 10-105873 A | 4/1998 | .............. G08G 1/017 |
| JP | 2000-182181 A | 6/2000 | .............. G08G 1/015 |
| JP | 2003-149256 A | 5/2003 | |
| JP | 2003-331217 A | 11/2003 | .............. G06K 9/20 |
| JP | 2004-234486 A | 8/2004 | .............. G06T 7/20 |
| JP | 2004-280713 A | 10/2004 | |
| JP | 2005-215984 A | 8/2005 | .............. G06K 9/03 |
| JP | 2005-267380 A | 9/2005 | .............. G06F 17/28 |
| JP | 2006-309402 A | 11/2006 | .............. G06K 9/62 |
| JP | 2007-072788 A | 3/2007 | .............. G08G 1/017 |
| JP | 2008-027325 A | 2/2008 | .............. G08G 1/017 |
| JP | 2009-301179 A | 12/2009 | .............. G08G 1/017 |

OTHER PUBLICATIONS

International Search Report for PCT/JP2009/001981.

*Primary Examiner* — Andrew W Johns
(74) *Attorney, Agent, or Firm* — Pearne & Gordon LLP

(57) ABSTRACT

An image and supplementary information of the image, such as a photographing point and time, are input by an image input section and are stored in an image data storage section. Character recognition in the image is performed by a character recognition section, and the recognition result is stored in a character recognition result storage section. An analysis section extracts object character information relevant to an object from the image, the supplementary information, and the character recognition result on the basis of the analysis conditions input in a designation section to thereby analyze an object, and the analysis result is output to a result output section. Accordingly, a change in the object can be analyzed by analyzing a change in character patterns indicating the identical object.

5 Claims, 26 Drawing Sheets

FIG.3

| IMAGE | POINT | TIME |
|---|---|---|
| (Pa1) | (Pa) | 08:10:00 |
| (Pa2) | (Pa) | 08:10:01 |
| (Pa3) | (Pa) | 08:10:02 |
| ⁓ | (Pa) | ⁓ |

FIG.4

| IMAGE | CHARACTER | CANDIDATE CHARACTER ① ② ③ | EVALUATION VALUE ① ② ③ | POSITION (Xs, Ys) (Xe, Ye) |
|---|---|---|---|---|
| (Pa1) | (C1) | 配 | 30 | ( 4, 192) ( 92, 112) |
|  | (C2) | 送 迷 道 | 45 55 90 | (108, 192) (188, 112) |
|  | (C3) | 1 | 10 | (512, 512) (552, 432) |
|  | (C4) | 2 | 15 | (560, 512) (600, 432) |
|  | (C5) | 3 8 9 | 5 40 55 | (608, 512) (648, 432) |
|  | (C6) | 4 1 | 15 75 | (656, 512) (696, 432) |
| (Pa2) | (C7) | 1 | 20 | (464, 192) (504, 112) |
|  | (C8) | 2 | 15 | (512, 192) (552, 112) |
|  | (C9) | 8 3 9 | 30 35 80 | (560, 192) (600, 112) |
|  | (C10) | 4 | 10 | (608, 192) (648, 112) |
| (Pa3) | (C11) | 3 5 | 20 5 | (768, 512) (808, 432) |
|  | (C12) | 3 | 15 | (816, 512) (856, 432) |
|  | (C13) | 3 | 10 | (864, 512) (904, 432) |
|  | (C14) | 3 8 | 25 8 | (912, 512) (952, 432) |
| ⁓ |  |  |  |  |

FIG.7

| IMAGE | CHARACTER | CANDIDATE CHARACTER ① ② ③ | EVALUATION VALUE ① ② ③ | POSITION (Xs, Ys)  (Xe, Ye) |
|---|---|---|---|---|
| (Pa1) | (C1) | 配 | 30 | ( 4, 192) ( 92, 112) |
|  | (C2) | 送  迷  道 | 45  55  90 | (108, 192) (188, 112) |
| (L1) { (C3) | 1 | 10 | (512, 512) (552, 432) |
|  | (C4) | 2 | 15 | (560, 512) (600, 432) |
|  | (C5) | 3  8  9 | 5  40  55 | (608, 512) (648, 432) |
|  | (C6) | 4  1 | 15  75 | (656, 512) (696, 432) |
| (Pa2) | (C7) | 1 | 20 | (464, 192) (504, 112) |
| (L2) { (C8) | 2 | 15 | (512, 192) (552, 112) |
|  | (C9) | 8  3  9 | 30  35  80 | (560, 192) (600, 112) |
|  | (C10) | 4 | 10 | (608, 192) (648, 112) |
| (Pa3) | (C11) | 3  5 | 20  5 | (768, 512) (808, 432) |
|  | (C12) | 3 | 15 | (816, 512) (856, 432) |
|  | (C13) | 3 | 10 | (864, 512) (904, 432) |
|  | (C14) | 3  8 | 25  8 | (912, 512) (952, 432) |

| CHARACTER STRING "1234" | TIME | CHARACTER | POSITION (Xs, Ys)  (Xe, Ye) |
|---|---|---|---|
| (L1) | 08:10:00 | (C3, 4, 5, 6) | (512, 512) (696, 432) |
| (L2) | 08:10:01 | (C7, 8, 9, 10) | (464, 192) (648, 112) |

FIG.8

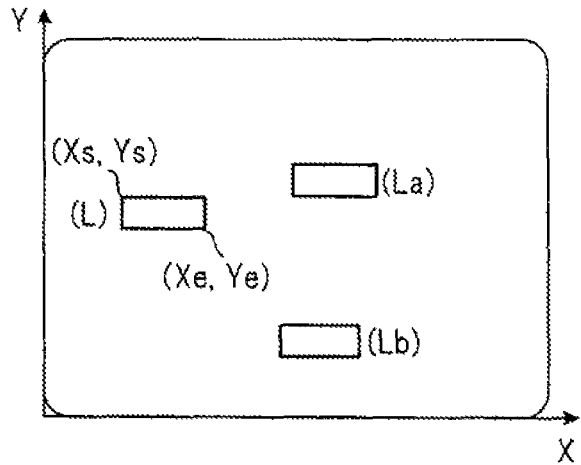

LEFTWARD MOVEMENT ...
LbYs≅LaYs, LbYe≅LaYe, LbXs<LaXs, LbXe<LaXe

RIGHTWARD MOVEMENT ...
LbYs≅LaYs, LbYe≅LaYe, LbXs>LaXs, LbXe>LaXe

DOWNWARD MOVEMENT ...
LbYs<LaYs, LbYe<LaYe, LbXs≅LaXs, LbXe≅LaXe

UPWARD MOVEMENT ...
LbYs>LaYs, LbYe>LaYe, LbXs≅LaXs, LbXe≅LaXe

FORWARD MOVEMENT ...
(LbYs+LbYe)/2 ≅(LaYs+LaYe)/2, (LbXs+LbXe)/2 ≅(LaXs+LaXe)/2,
LbYs> LaYs, LbYe<LaYe, LbXs<LaXs, LbXe> LaXe

BACKWARD MOVEMENT ...
(LbYs+LbYe)/2 ≅(LaYs+LaYe)/2, (LbXs+LbXe)/2 ≅(LaXs+LaXe)/2,
LbYs< LaYs, LbYe>LaYe, LbXs>LaXs, LbXe< LaXe

FIG.10

| IMAGE | DISTANCE FROM STARTING POSITION | TIME |
|---|---|---|
| ≀ | | |
| (Pb1) | 50km | 9:30 |
| (Pb2) | 50km | 10:00 |
| (Pb3) | 50km | 10:30 |
| ≀ | | |

| IMAGE | DISTANCE FROM STARTING POSITION | TIME |
|---|---|---|
| ≀ | | |
| (Pc1) | 100km | 9:30 |
| (Pc2) | 100km | 10:00 |
| (Pc3) | 100km | 10:30 |
| ≀ | | |

| IMAGE | DISTANCE FROM STARTING POSITION | TIME |
|---|---|---|
| ≀ | | |
| (Pd1) | 150km | 9:30 |
| (Pd2) | 150km | 10:00 |
| (Pd3) | 150km | 10:30 |
| ≀ | | |

| IMAGE | CHARACTER | CANDIDATE CHARACTER ① ② ③ | EVALUATION VALUE ① ② ③ | POSITION (Xs, Ys) (Xe, Ye) |
|---|---|---|---|---|
| ≀ | | | | |
| (Pb1) | (C11) | 5 | 10 | (672, 640) (712, 560) |
| | (C12) | 6  5 | 15  60 | (720, 640) (760, 560) |
| | (C13) | 7  1 | 5  75 | (768, 640) (808, 560) |
| | (C14) | 8 | 15 | (816, 640) (856, 560) |
| ≀ | | | | |
| (Pc2) | (C21) | ⑤  6 | 20  80 | (160, 256) (200, 176) |
| | (C22) | ⑥ | 15 | (208, 256) (248, 176) |
| | (C23) | ⑦ | 30 | (256, 256) (296, 176) |
| | (C24) | ⑧  ③  9 | 10  40  90 | (304, 256) (344, 176) |
| ≀ | | | | |
| (Pd3) | (C31) | 5  6 | 20  45 | (672, 384) (712, 304) |
| | (C32) | 6  5 | 15  55 | (720, 384) (760, 304) |
| | (C33) | 7 | 10 | (768, 384) (808, 304) |
| | (C34) | 3 | 30 | (816, 384) (856, 304) |
| ≀ | | | | |

| | IMAGE | CHARACTER | CANDIDATE CHARACTER ① ② ③ | EVALUATION VALUE ① ② ③ | POSITION (Xs, Ys)   (Xe, Ye) | |
|---|---|---|---|---|---|---|
| | | | | | | 104 |
| (L11) | (Pb1) | (C11) | 5 | 10 | (672, 640) (712, 560) | |
| | | (C12) | 6  5 | 15  60 | (720, 640) (760, 560) | |
| | | (C13) | 7  1 | 5  75 | (768, 640) (808, 560) | |
| | | (C14) | 8 | 15 | (816, 640) (856, 560) | |
| (L12) | (Pc2) | (C21) | 5  6 | 20  80 | (160, 256) (200, 176) | |
| | | (C22) | 6 | 15 | (208, 256) (248, 176) | |
| | | (C23) | 7 | 30 | (256, 256) (296, 176) | |
| (L21) | | (C24) | 8  3  9 | 10  40  90 | (304, 256) (344, 176) | |
| | (Pd3) | (C31) | 5  6 | 20  45 | (672, 384) (712, 304) | |
| | | (C32) | 6  5 | 15  55 | (720, 384) (760, 304) | |
| | | (C33) | 7 | 10 | (768, 384) (808, 304) | |
| (L22) | | (C34) | 3 | 30 | (816, 384) (856, 304) | |

| CHARACTER STRING "5678" | DISTANCE | TIME | CHARACTER | POSITION (Xs, Ys)   (Xe, Ye) | COLOR |
|---|---|---|---|---|---|
| (L11) | 50km | 09:30 | (C11, 12, 13, 14) | (672, 640) (856, 560) | RED |
| (L12) | 100km | 10:00 | (C21, 22, 23, 24) | (160, 256) (344, 176) | RED |

| CHARACTER STRING "5673" | DISTANCE | TIME | CHARACTER | POSITION (Xs, Ys)   (Xe, Ye) | COLOR |
|---|---|---|---|---|---|
| (L21) | 100km | 10:00 | (C21, 22, 23, 24) | (160, 256) (344, 176) | RED |
| (L22) | 150km | 10:30 | (C31, 32, 33, 34) | (672, 384) (856, 304) | WHITE |

FIG.17

| IMAGE | POINT | TIME | RECORDING COMPLETION FLAG | |
|---|---|---|---|---|
| ⋮ | ⋮ | ⋮ | | |
| (Pa0) | (Pa) | 2008/03/01/ 08:00:00 | NO | ⎫ |
| (Pa1) | (Pa) | 2008/03/01/ 08:00:01 | NO | ⎬ n IMAGES |
| (Pa2) | (Pa) | 2008/03/01/ 08:00:02 | NO | ⎭ |

FIG.18
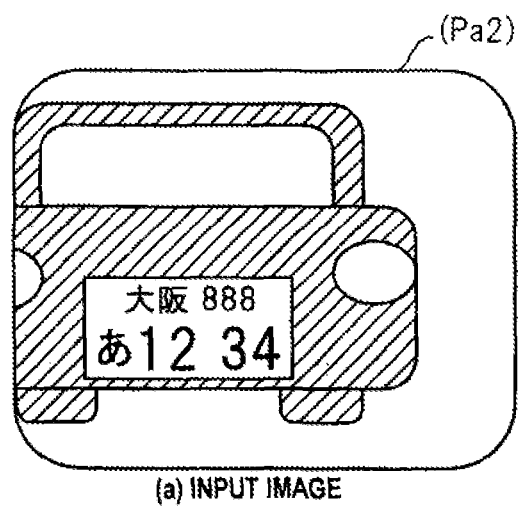
(a) INPUT IMAGE
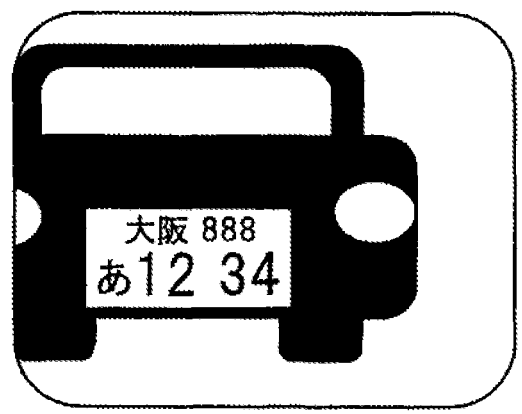
(b) BINARY IMAGE
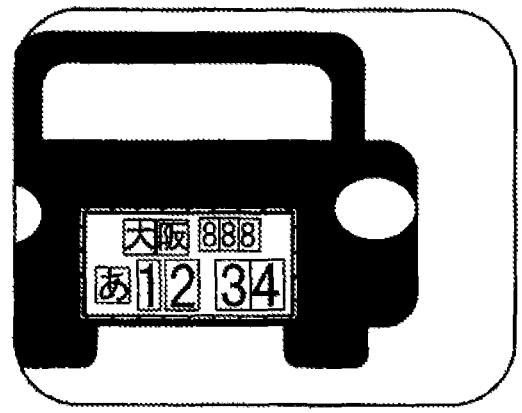
(c) CHARACTER REGION (d) CHARACTER REGION (ENLARGED VIEW)

| CHARACTER REGION | CHARACTER | POSITION AND SIZE | CHARACTER STRING |
|---|---|---|---|
| (A2) | c6 | 328,469, 32×33 | (L2) |
| | c7 | 367,468, 33×33 | |
| | c8 | 408,469, 18×32 | |
| | c9 | 430,469, 18×31 | |
| | c10 | 452,468, 18×33 | |
| | c11 | 277,531, 31×33 | (L3) |
| | c12 | 330,512, 10×33 | |
| | c13 | 368,514, 33×66 | |
| | c14 | 430,513, 32×67 | |
| | c15 | 483,514, 31×65 | |

(e) CHARACTER COORDINATES

| CHARACTER REGION | CHARACTER | RECOGNITION RESULT ① ② ③ | EVALUATION VALUE ① ② ③ | POSITION AND SIZE | CHARACTER STRING |
|---|---|---|---|---|---|
| (A2) | c6 | ? ? ? | 99 99 99 | 328,331, 32×33 | (L2) |
| | c7 | ? ? ? | 99 99 99 | 367,332, 33×33 | |
| | c8 | 8 3 9 | 20 55 60 | 408,331, 18×32 | |
| | c9 | 8 3 9 | 22 60 65 | 430,331, 18×31 | |
| | c10 | 8 9 3 | 40 55 60 | 452,332, 18×33 | |
| | c11 | ? ? ? | 99 99 99 | 277,269, 31×33 | (L3) |
| | c12 | 1 · ~ | 5 30 45 | 330,286, 10×66 | |
| | c13 | 2 1 3 | 5 60 90 | 368,287, 33×66 | |
| | c14 | 3 8 9 | 15 55 70 | 430,287, 32×67 | |
| | c15 | 4 9 1 | 10 55 60 | 483,286, 31×65 | |

(f) RECOGNITION RESULT

| IMAGE | CHARACTER REGION | CHARACTER | RECOGNITION RESULT ① ② ③ | EVALUATION VALUE ① ② ③ | POSITION AND SIZE | CHARACTER STRING |
|---|---|---|---|---|---|---|
| (Pa0) | NONE | | | | | |
| (Pa1) | (A1) | c1 | ? ? ? | 99 99 99 | 370,469, 22×23 | (L1) |
| | | c2 | 1 4 · | 25 33 55 | 407,486, 7×46 | |
| | | c3 | 2 3 1 | 20 60 90 | 434,487, 23×47 | |
| | | c4 | 8 3 9 | 35 40 70 | 490,487, 22×47 | |
| | | c5 | 4 9 1 | 30 55 60 | 514,486, 22×46 | |
| (Pa2) | (A2) | c6 | ? ? ? | 99 99 99 | 328,331, 32×33 | (L2) |
| | | c7 | ? ? ? | 99 99 99 | 367,332, 33×33 | |
| | | c8 | 8 3 9 | 20 55 60 | 408,331, 18×32 | |
| | | c9 | 8 3 9 | 22 60 65 | 430,331, 18×31 | |
| | | c10 | 8 3 9 | 40 55 60 | 452,332, 18×33 | |
| | | c11 | ? ? ? | 99 99 99 | 277,269, 31×33 | (L3) |
| | | c12 | 1 - · | 5 30 45 | 330,286, 10×66 | |
| | | c13 | 2 1 3 | 5 60 90 | 368,287, 33×66 | |
| | | c14 | 3 8 9 | 15 40 70 | 430,287, 32×67 | |
| | | c15 | 4 9 1 | 10 55 60 | 483,286, 31×65 | | n IMAGES (R2)

CONTENTS OF RECOGNITION RESULT STORAGE SECTION WHEN IMAGE (Pa2) IS NEWEST

FIG.22

| IMAGE | CHARACTER REGION | CHARACTER | RECOGNITION RESULT ① ② ③ | EVALUATION VALUE ① ② ③ | POSITION AND SIZE | CHARACTER STRING |
|---|---|---|---|---|---|---|
| (Pa0) | NONE | | | | | |
| (Pa1) | (A1) | c1 | ? ? ? | 99 99 99 | 370,469, 22×23 | |
| | | c2 | 1 4 · | 25 30 55 | 407,486,  7×46 | (L1) |
| | | c3 | 2 3 1 | 20 60 90 | 434,487, 23×47 | |
| | | c4 | 8 3 9 | 35 40 70 | 490,487, 22×47 | |
| | | c5 | 4 9 1 | 30 55 60 | 514,486, 22×46 | |
| (Pa2) | (A2) | c6 | ? ? ? | 99 99 99 | 328,331, 32×33 | |
| | | c7 | ? ? ? | 99 99 99 | 367,332, 33×33 | |
| | | c8 | 8 3 9 | 20 55 60 | 408,331, 18×32 | (L2) |
| | | c9 | 8 3 9 | 22 60 65 | 430,331, 18×31 | |
| | | c10 | 8 3 9 | 40 55 60 | 452,332, 18×33 | |
| | | c11 | ? ? ? | 99 99 99 | 277,269, 31×33 | |
| | | c12 | 1 - - | 5 30 45 | 330,286, 10×66 | |
| | | c13 | 2 1 3 | 5 60 90 | 368,287, 33×66 | (L3) |
| | | c14 | 3 8 9 | 15 40 70 | 430,287, 32×67 | |
| | | c15 | 4 9 1 | 10 55 60 | 483,286, 31×65 | |
| (Pa3) | NONE | | | | | | n IMAGES

215

(R3)

CONTENTS OF RECOGNITION RESULT STORAGE SECTION WHEN IMAGE (Pa3) IS NEWEST

FIG.25

| SUPPLEMENTARY INFORMATION (POINT AND TIME) | IMAGE | CHARACTER REGION | CHARACTER | RECOGNITION RESULT ① ② ③ | EVALUATION VALUE ① ② ③ | POSITION AND SIZE | CHARACTER STRING |
|---|---|---|---|---|---|---|---|
| POINT: (Pb) 2008/03/01 07:55:30 | (Pb1) | (A21) | c21 | ? ? ? | 99 99 99 | 406,531, 23×23 | |
| | | | c22 | ? ? ? | 99 99 99 | 433,532, 23×23 | |
| | | | c23 | 3 9 1 | 20 55 60 | 462,531, 13×22 | (L21) |
| | | | c24 | 2 | 22 | 477,531, 13×22 | |
| | | | c25 | 1 · | 40 55 | 492,532, 13×23 | |
| | | | c26 | ? ? ? | 99 99 99 | 370,489, 23×23 | |
| | | | c27 | 5 6 3 | 5 30 45 | 407,506, 23×46 | |
| | | | c28 | 6 5 3 | 5 60 90 | 434,507, 23×46 | (L22) |
| | | | c29 | 7 1 | 15 40 | 490,507, 22×47 | |
| | | | c30 | 8 9 3 | 10 55 60 | 512,506, 22×46 | |
| POINT: (Pc) 2008/03/01 07:57:15 | (Pc1) | (A31) | c31 | ? ? ? | 99 99 99 | 628,331, 32×33 | |
| | | | c32 | ? ? ? | 99 99 99 | 667,332, 33×33 | |
| | | | c33 | 8 3 9 | 20 55 60 | 708,331, 18×32 | (L31) |
| | | | c34 | 8 3 9 | 30 60 65 | 730,331, 18×31 | |
| | | | c35 | 8 3 9 | 40 55 60 | 752,332, 18×33 | |
| | | | c36 | ? ? ? | 99 99 99 | 577,269, 31×33 | |
| | | | c37 | 1 7 | 5 80 | 630,286, 10×66 | |
| | | | c38 | 2 3 | 20 55 | 668,287, 33×66 | (L32) |
| | | | c39 | 3 8 | 25 55 | 730,287, 32×67 | |
| | | | c40 | 4 7 | 30 60 | 783,286, 31×65 | |

216 m IMAGES

PATTERN RECOGNITION APPARATUS, PATTERN RECOGNTION METHOD, IMAGE PROCESSING APPARATUS, AND IMAGE PROCESSING METHOD

RELATED APPLICATIONS

This application is a division of U.S. patent application Ser. No. 12/601,989 filed on Dec. 15, 2009, now U.S. Pat. No. 8,509,571, which is incorporated herein by reference in its entirety.

TECHNICAL FIELD

The present invention relates to a pattern recognition technique used to analyze changes in a recorded object using the character information which is simultaneously recorded, on the basis of a plurality of images in which an object which may change, is recorded.

BACKGROUND ART

Techniques for recognizing various patterns included in an image by processing the input image have been proposed in the past. For example, Patent Document 1 assumes that a character string on a map is recognized by processing an image in which the contents of the map are included or the character string information with a fixed size, which is inserted at a predetermined position of a moving image, is recognized by pattern recognition.

For example, in a known pattern recognition apparatus disclosed in Patent Document 1, character patterns are divided into a plurality of groups according to the position or size of a character pattern included in an image and the degree of matching of candidate character codes of character recognition, and a character code corresponding to the character pattern is determined using all characters included in a group.

FIG. 28 is a flow chart showing the details of control in a known pattern recognition method disclosed in Patent Document 1. In the control shown in FIG. 28, in a character candidate acquisition process (S1 to S6), a character pattern is extracted from an image and a corresponding candidate character code and its reliability are acquired. In a grouping process (S3), a character group is generated by the grouping of character patterns. In a matched character group detection process (S6), matched character groups are detected by performing the matching of the acquired candidate character codes, which are included in the generated character groups included in the image, between each of the character groups. In a character code determination process (S7 to S9), the reliability corresponding to each candidate character code included in the detected matched character groups is counted, and a character code corresponding to the character pattern included in the character group is determined on the basis of the counted reliability.

In addition, there is a known image processing apparatus which performs both a determination of whether or not read characters match and a determination of whether or not the shapes of objects match in consideration of character reading error (for example, refer to Patent Document 2). FIG. 29 is a block diagram showing the schematic configuration of a known image processing apparatus disclosed in Patent Document 2. In this drawing, an image photographed by a camera 10 is digitally converted in an ADC 12 and is then stored in an image memory 14. The newest image data is always held in the image memory 14. A binarization circuit 16 binarizes the data of the image memory 14, a plate segmentation section 18 segments number plate images, a character segmentation section 20 segments character images in the number plate image, a character recognition section 22 performs character recognition processing, and the result is stored in a memory 38.

On the other hand, a main calculation section 30 calculates the number plate position, a coordinate calculating section 32 calculates the coordinates at which an edge is detected, an edge detecting section 34 generates an edge image, a matrix generating section 36 generates a shape determination matrix according to the existence of an edge at the designated coordinates, and the result is stored in a memory 40. A determination section 42 determines whether or not the object is the same by comparing the obtained car number with the last result and controls the output of a car number.

RELATED ART DOCUMENT

Patent Document

[Patent Document 1] JP-A-9-81689
[Patent Document 2] JP-A-7-272189

SUMMARY OF THE INVENTION

Problem that the Invention is to Solve

However, in the known pattern recognition techniques described above, even character strings related to the identical object could not be treated as being associated with the identical object when the object changes due to movement, size change, and the like.

In the known techniques, character patterns are divided into a plurality of groups according to the position or size of characters in an image, and a character code corresponding to the character pattern is determined using all characters included in the group. Accordingly, even in the case where character patterns indicating the identical object exist in a plurality of images whose photographing time is different, for example, if they exist in a state where the position or size of an object changes in every image, they are recognized as character patterns indicating objects which are independent in every image. For this reason, it is not possible to associate character patterns with objects for a plurality of images.

For example, in the case where a car is automatically monitored on the basis of moving images obtained by photographing various cars moving on the road with a camera, it becomes possible to trace the state of each car if each car can be matched with a character string, such as a number displayed on a number plate of each car, or the contents of a character string, such as an advertisement displayed on the body of a car. However, since an object and the size or position of a character string pattern indicating the object change in every image with movement of each car or the like, the character string pattern is treated as if it were independent in every image in the known techniques. Therefore, regarding an object such as a moving car, it is not possible to manage, for example, a specific car and a number or the like displayed on the number plate as a time-series state change by associating them with each other.

In addition, in the known image processing apparatus described above, the object is limited to a car provided with a number plate. Accordingly, there is a problem that it could be used only in the situation where a camera is installed in a specific place, such as a road or a parking lot, so that the entire number plate could be seen, and it could not be used in other situations.

The present invention has been made in view of the above situation, and it is an object of the present invention to provide a pattern recognition apparatus and a pattern recognition method capable of, even when a plurality of images exist in which the positions or sizes of character patterns indicating the identical object are different from each other, treating them as character patterns indicating the identical object. Furthermore, it is another object of the present invention to provide an image processing apparatus and an image processing method capable of selectively recording an image with significant information without limiting the object to being a number plate.

Means for Solving the Problem

The present invention provides a pattern recognition apparatus including: an image input section which inputs an image, in which an object to be recognized may be included, and supplementary information related to the image; an image data storage section which stores the image and the supplementary information input in the image input section; a character recognition section which recognizes a character included in the image input in the image input section; a character recognition result storage section which stores a character recognition result recognized in the character recognition section; a designation section which inputs an analysis condition of an object; an analysis section which analyzes the object by extracting object character information relevant to the object from the image and the supplementary information which are stored in the image data storage section, and the character recognition result which is stored in the character recognition result storage section, on the basis of the analysis condition input in the designation section; and a result output section which outputs a result analyzed in the analysis section.

According to this configuration, an object is analyzed by extracting the object character information relevant to the object from the stored image and supplementary information and the stored character recognition result on the basis of the predetermined input analysis conditions. Accordingly, for example, even if a plurality of images exist in a state where the positions or sizes of character patterns indicating the identical object are different from each other, it becomes possible to commonly treat the character patterns indicating the identical object in the plurality of images. Therefore, it becomes possible to analyze a change in the object indicated by the character pattern by analyzing, for example, a change (movement or the like) in character patterns using the character recognition result.

As the supplementary information, it is assumed that information, such as the installation position or photographing time of a camera which photographs the image, is used. That is, for example, in the case of processing a plurality of images which is photographed at the same point and whose photographing time is slightly different, the identical object (car or the like) may be included in these images. However, there is a high possibility that the positions, sizes, and the like of objects and character patterns (for example, display numbers on a number plate of a car) indicating the objects in the image will deviate in every image, and there will be a few cases where they are completely equal. However, if a plurality of images is processed in consideration of whether or not the photographing points are equal, the difference in photographing time, or the like, it becomes possible to recognize changes (movements or the like) in objects and character patterns indicating the objects. Accordingly, since the identical object which appears in the plurality of images and character patterns indicating the identical object can be treated as a common element, it also becomes possible to detect a situation of changes in the objects and character patterns indicating the objects.

The present invention includes the pattern recognition apparatus, wherein the character recognition section acquires, as a recognition result, information including a candidate character code corresponding to a character pattern, an evaluation value regarding character recognition, and the position and size of a character, and the analysis section performs analysis using the candidate character code, the evaluation value, and the position and size of the character.

According to this configuration, the candidate character code and the evaluation value which are character recognition results, and the position and size of a character are used when the analysis section performs analysis. For example, even if character patterns indicating an object appear in a plurality of images in a state where the character patterns are slightly different from each other due to a change in the object, the character patterns can be easily treated as those indicating a common object.

For example, in the case where character recognition is difficult, a plurality of candidate character codes is extracted as a recognition result for one character pattern. However, one appropriate character can be selected from a plurality of candidate characters by referring to the evaluation value indicating the reliability or the like of each extracted candidate character. In addition, it becomes possible to distinguish whether or not a character pattern in each image is a character indicating a common object by taking into consideration the similarity of the positions or sizes of character patterns detected in a plurality of images.

The present invention includes the pattern recognition apparatus, wherein the image input section inputs information which includes at least the photographing position and photographing time regarding the corresponding image, as the supplementary information, and the analysis section performs analysis using the photographing position and photographing time of the image.

According to this configuration, the information on the photographing position and photographing time which are included as supplementary information of an image to be processed, is used when the analysis section performs analysis. Therefore, it becomes easy to determine whether or not objects appearing in a plurality of images and character patterns indicating the objects are the identical objects. For example, in the case where an object and a character pattern indicating the object appear in two images which are photographed at the same point and whose photographing time is very close, it becomes possible to determine whether or not the objects and the character patterns in the plurality of images are the identical objects from the similarity of photographing time or the like.

The present invention includes the pattern recognition apparatus, wherein the image input section inputs information which includes at least the photographing position and photographing time regarding the corresponding image, as the supplementary information, the character recognition section acquires, as a recognition result, information including a candidate character code corresponding to a character pattern, an evaluation value regarding character recognition, and the position and size of a character, and the analysis section performs analysis using the photographing position and photographing time of the image, the candidate character code and the evaluation value, the position and size of the character, similarities of character images between a plurality of images, and color information of images.

According to this configuration, the information on the photographing position and photographing time included as supplementary information of an image to be processed, the character code and evaluation value obtained as a character recognition result, the position and size of a character, the similarities of character images between a plurality of images, and the color information of images are used when the analysis section performs analysis. Therefore, it becomes easy to determine whether or not objects appearing in a plurality of images and character patterns indicating the objects are the identical objects.

For example, in the case where an object and a character pattern indicating the object appear in two images which are photographed at the same point and whose photographing time is very close, it becomes possible to determine whether or not the objects and the character patterns in the plurality of images are the identical objects from the similarity of photographing time or the like. In addition, by determining the similarities of character patterns using the character code and evaluation value obtained as a character recognition result of each character pattern and the position and size of a character, it is possible to determine whether or not character patterns in a plurality of images indicate a common object. In addition, it becomes easy to determine whether or not character patterns in a plurality of images indicate a common object by using the similarities of character images between a plurality of images and the color information.

The present invention provides a pattern recognition method including: an image input step of inputting an image in which an object to be recognized may be included, and supplementary information related to the image; an image data storage step of storing the image and the supplementary information input in the image input step; a character recognition step of recognizing a character included in the image input in the image input step; a character recognition result storage step of storing a character recognition result recognized in the character recognition step; a designation step of inputting an analysis condition of an object; an analysis step of analyzing the object by extracting object character information relevant to the object from the image and the supplementary information which are stored in the image data storage step, and the character recognition result which is stored in the character recognition result storage step, on the basis of the analysis condition input in the designation step; and a result output step of outputting a result analyzed in the analysis section.

According to this method, an object is analyzed by extracting the object character information relevant to the object from the stored image and supplementary information and the stored character recognition result on the basis of the predetermined input analysis condition. Accordingly, for example, even if a plurality of images exist in a state where the positions or sizes of character patterns indicating the identical object are different from each other, it becomes possible to commonly treat the character patterns indicating the identical object on the plurality of images. Therefore, it becomes possible to analyze a change in the object indicated by the character pattern by analyzing, for example, a change (movement or the like) in character patterns using the character recognition result.

The present invention includes the pattern recognition method, wherein in the character recognition step, information including a candidate character code corresponding to a character pattern, an evaluation value regarding character recognition, and the position and size of a character are acquired as a recognition result, and in the analysis step, analysis is performed using the candidate character code, the evaluation value, and the position and size of the character.

According to this method, the candidate character code and the evaluation value, which are character recognition results, and the position and size of a character are used when performing analysis in the analysis step. For example, even if character patterns indicating an object appear in a plurality of images in a state where the character patterns are slightly different from each other due to a change in the object, the character patterns can be easily treated as those indicating a common object.

The present invention includes the pattern recognition method, wherein in the image input step, information including at least the photographing position and photographing time regarding a corresponding image is input as the supplementary information, and in the analysis step, analysis is performed using the photographing position and photographing time of the image.

According to this method, the information on the photographing position and photographing time, which are included as supplementary information of an image to be processed, is used when performing analysis in the analysis step. Therefore, it becomes easy to determine whether or not objects appearing in a plurality of images and character patterns indicating the objects are the identical objects.

The present invention includes the pattern recognition method, wherein in the image input step, information including at least the photographing position and photographing time regarding a corresponding image is input as the supplementary information, in the character recognition step, information including a candidate character code corresponding to a character pattern, an evaluation value regarding character recognition, and the position and size of a character are acquired as a recognition result, and in the analysis step, analysis is performed using the photographing position and photographing time of the image, the candidate character code and the evaluation value, the position and size of the character, similarities of character images between a plurality of images, and color information of images.

According to this method, the information on the photographing position and photographing time, which are included as supplementary information of an image to be processed, the character code and evaluation value obtained as a character recognition result, the position and size of a character, the similarities of character images between a plurality of images, and the color information of images are used when performing analysis in the analysis step. Therefore, it is easy to determine whether or not objects appearing in a plurality of images and character patterns indicating the objects are the identical objects.

The present invention provides a program causing a computer to execute each step of any of the pattern recognition method as mentioned above.

The present invention provides a computer-readable storage medium in which the program is recorded An image processing apparatus of the present invention includes: an image input means for continuously inputting an image and supplementary information related to the image; an image temporary storage means for temporarily storing the image input in the image input means; a character extraction means for extracting a character from the image stored in the image temporary storage means; a character recognition means for recognizing the character extracted in the character extraction means to thereby obtain as a recognition result one or more of candidate characters for the recognized character and each evaluation value; a recognition result storage means for storing the recognition result obtained in the character recognition means; a recognition result evaluation means for determining whether to output the image which is stored in the image temporary storage means, on the basis of the recognition result stored in the recognition result storage means; and an image output control means for outputting the image determined to be output in the recognition result evaluation means together with the supplementary information of the image and the recognition result, and the image temporary storage means temporarily stores a plurality of images together with supplementary information thereof, the recognition result storage means stores recognition results of characters of the plurality of images stored in the image temporary storage means, the recognition result evaluation means checks the recognition results of the characters of the plurality of images stored in the image temporary storage means and selects the image with the best evaluation value for the recognition result when an identical character string is included in the recognition results of the plurality of images, and the image output control means outputs the image selected in the recognition result evaluation means together with the supplementary information and the recognition result of the image.

According to this configuration, when the recognition result evaluation means determines the identity of recognition results, it can be prevented that the identical object is determined not to be the identical object due to a recognition error because the determination is made not only by a single recognition result but also by a combination of candidate characters. Therefore, since features other than the character recognition result do not need to be used for determination of the identity of objects, an image with significant information can be selected among a large number of images input from the image input means without limiting the object to being a number plate. In addition, since the identity of objects is determined only from the characters of the objects, it is not influenced by the size and direction of the photograph of an object. Accordingly, even between images from different image input means, the identity of objects can be determined.

In the above configuration, the recognition result evaluation means checks the recognition results of the characters of the plurality of images stored in the image temporary storage means, and when the evaluation values are bad for recognition results of all characters even though characters are included in one image, notifies the effect to the image output control means, and the image output control means outputs the image notified from the recognition result evaluation means together with the supplementary information of the image and the recognition result.

According to this configuration, an image with bad image quality, for which a recognition result with a good evaluation value could not be obtained even though a character could be recognized, is output. Accordingly, an image with a bad image quality can also be reprocessed by a high-function PC or recognition software.

In the above configuration, the image processing apparatus further includes a multi-camera recognition result cooperation means for storing a recognition result of characters in an image and supplementary information of the image used to obtain the recognition result, which are an output of another image processing apparatus connected through a network. The recognition result evaluation means checks the recognition result stored in the recognition result storage means and the recognition result stored in the multi-camera recognition result cooperation means, and notifies the image output control means that the image is not output when the identical character string is included in both the recognition results and the supplementary information of the image and the evaluation values of the recognition results satisfy predetermined conditions; and notifies the image output control means that the image is output when a character string included in the recognition result stored in the recognition result storage means is not included in the recognition result stored in the multi-camera recognition result cooperation means or when the supplementary information of the image and the evaluation values of the recognition results do not satisfy the predetermined conditions even if a character string included in the recognition result stored in the recognition result storage means is included in the recognition result stored in the multi-camera recognition result cooperation means, and the image output control means outputs the image, the supplementary information of the image, and the recognition result to the network when it is notified from the recognition result evaluation means that the image is output.

According to this configuration, when a character string included in the recognition result stored in the recognition result storage means is not included in the recognition result stored in the multi-camera recognition result cooperation means or when the supplementary information of the image and the evaluation values of the recognition results do not satisfy the predetermined conditions even if a character string included in the recognition result stored in the recognition result storage means is included in the recognition result stored in the multi-camera recognition result cooperation means, the image and the supplementary information and recognition result of the image can be recorded in an external image storage medium which is connectable to a network. In addition, another image processing apparatus connected to the network may acquire the supplementary information and recognition result of the image and record them in its own multi-camera recognition result cooperation means.

An image processing method according to the present invention includes: an image input process of continuously inputting an image and supplementary information related to the image; an image temporary storage process of temporarily storing the image input in the image input process; a character extraction process of extracting a character from the image stored in the image temporary storage process; a character recognition process of recognizing the character extracted in the character extraction process to thereby obtain as a recognition result one or more of candidate characters for the recognized character and each evaluation value; a recognition result storage process of storing the recognition result obtained in the character recognition process; a recognition result evaluation process of determining whether to output the image, which is stored in the image temporary storage process, on the basis of the recognition result stored in the recognition result storage process; and an image output control process of outputting the image determined to be output in the recognition result evaluation process together with the supplementary information of the image and the recognition result, and in the image temporary storage process, a plurality of images is temporarily stored together with supplementary information thereof, in the recognition result storage process, recognition results of characters of the plurality of images stored in the image temporary storage process are stored, in the recognition result evaluation process, the recognition results of the characters of the plurality of images stored in the image temporary storage process are checked and the image with the best evaluation value for the recognition result is selected when an identical character string is included in the recognition results of the plurality of images, and in the image output control process, the image selected in the recognition result evaluation process is output together with the supplementary information and the recognition result of the image.

According to this method, when the identity of recognition results is determined in the recognition result evaluation process, it can be prevented that the identical object is determined not to be the identical object due to a recognition error because the determination is made not only by a single recognition result but also by a combination of candidate characters. Therefore, since features other than the character recognition result do not need to be used for determination of the identity of objects, an image with significant information can be selected among a large number of images input in the image input process without limiting the object to being a number plate. In addition, since the identity of objects is determined only from characters of the objects, it is not influenced by the size and direction of the photograph of an object. Accordingly, even between images from different image input processes, the identity of objects can be determined.

An image processing program according to the present invention includes: an image input step of continuously inputting an image and supplementary information related to the image; an image temporary storage step of temporarily storing the image input in the image input step; a character extraction step of extracting a character from the image stored in the image temporary storage step; a character recognition step of recognizing the character extracted in the character extraction step to thereby obtain as a recognition result one or more of candidate characters for the recognized character and each evaluation value; a recognition result storage step of storing the recognition result obtained in the character recognition step; a recognition result evaluation step of determining whether to output the image, which is stored in the image temporary storage step, on the basis of the recognition result stored in the recognition result storage step; and an image output control step of outputting the image determined to be output in the recognition result evaluation step together with the supplementary information of the image and the recognition result, and in the image temporary storage step, a plurality of images is temporarily stored together with supplementary information thereof, in the recognition result storage step, recognition results of characters of the plurality of images stored in the image temporary storage step are stored, in the recognition result evaluation step, the recognition results of the characters of the plurality of images stored in the image temporary storage step are checked and the image with the best evaluation value for the recognition result is selected when an identical character string is included in the recognition results of the plurality of images, and in the image output control step, the image selected in the recognition result evaluation step is output together with the supplementary information and the recognition result of the image, and the computer executes each of the steps.

According to this program, when the identity of recognition results is determined in the recognition result evaluation step, it can be prevented that the identical object is determined not to be the identical object due to a recognition error because the determination is made not only by a single recognition result but also by a combination of candidate characters. Therefore, since features other than the character recognition result do not need to be used for determination of the identity of objects, an image with significant information can be selected among a large number of images input in the image input step without limiting the object to being a number plate. In addition, since the identity of objects is determined only from characters of the objects, it is not influenced by the size and direction of the photograph of an object. Accordingly, even between images from different image input steps, the identity of objects can be determined.

A storage medium according to the present invention records the image processing program therein.

According to this storage medium, the same effect as in the image processing program described above can be obtained.

Advantage of the Invention

According to the present invention, it is possible to provide a pattern recognition apparatus and a pattern recognition method capable of, even when a plurality of images exists in which the positions or sizes of character patterns indicating the identical object are different, treating them as character patterns indicating the identical object. Furthermore, according to the present invention, it is possible to provide an image processing apparatus and an image processing method capable of selectively recording an image with significant information without limiting the object to being a number plate.

BRIEF DESCRIPTION OF THE DRAWINGS

FIG. 3 is a schematic view showing an example of the configuration of the supplementary information of the image sequence according to the first embodiment.

FIG. 4 is a schematic view showing an example of the configuration of the information of a character recognition result of the image sequence according to the first embodiment.

FIG. 7 is a schematic view showing the configuration of the information of a processing result recorded for a character string which is an object in the first embodiment.

FIG. 8 is a schematic view showing the criteria for determining the movement direction of a character string which is an object used in the present embodiment.

FIG. 10 is a schematic view showing an example of the configuration of the supplementary information of an image sequence according to the second embodiment.

FIG. 11 is a schematic view showing an example of the configuration of the information of a character recognition result of the image sequence according to the second embodiment.

FIG. 13 is a schematic view showing the configuration of the information of a processing result recorded for a character string which is an object in the second embodiment.

FIG. 17 is a view for explaining images and supplementary information recorded in an image data temporary storage section of the image processing apparatus of FIG. 14.

FIG. 18 is a view for explaining a character recognition process in the image processing apparatus of FIG. 14.

FIG. 21 is a view for explaining a recognition result held in a recognition result storage section of the image processing apparatus of FIG. 14.

FIG. 22 is a view for explaining a recognition result held in the recognition result storage section of the image processing apparatus of FIG. 14.

FIG. 25 is a view for explaining the data stored in a multi-camera recognition result cooperation section of the image processing apparatus of FIG. 14.

MODE FOR CARRYING OUT THE INVENTION

First Embodiment

Figure 1:
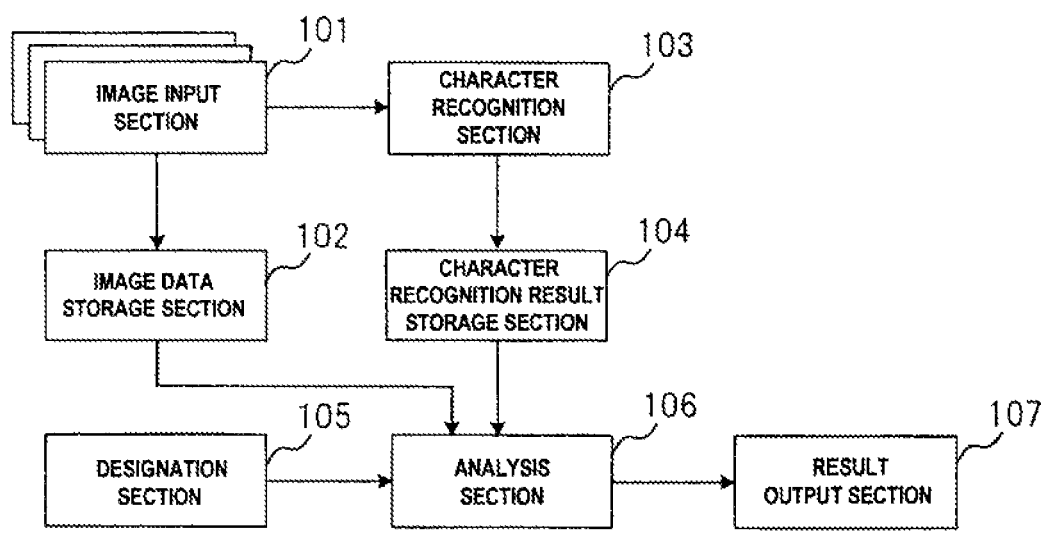
FIG. 1 is a block diagram showing the configuration of a pattern recognition apparatus according to embodiments of the present invention.

FIG. 1 is a block diagram showing the configuration of a pattern recognition apparatus according to an embodiment of the present invention. The pattern recognition apparatus of the present embodiment includes an image input section 101, an image data storage section 102, a character recognition section 103, a character recognition result storage section 104, a designation section 105, an analysis section 106, and a result output section 107.

Figure 2:
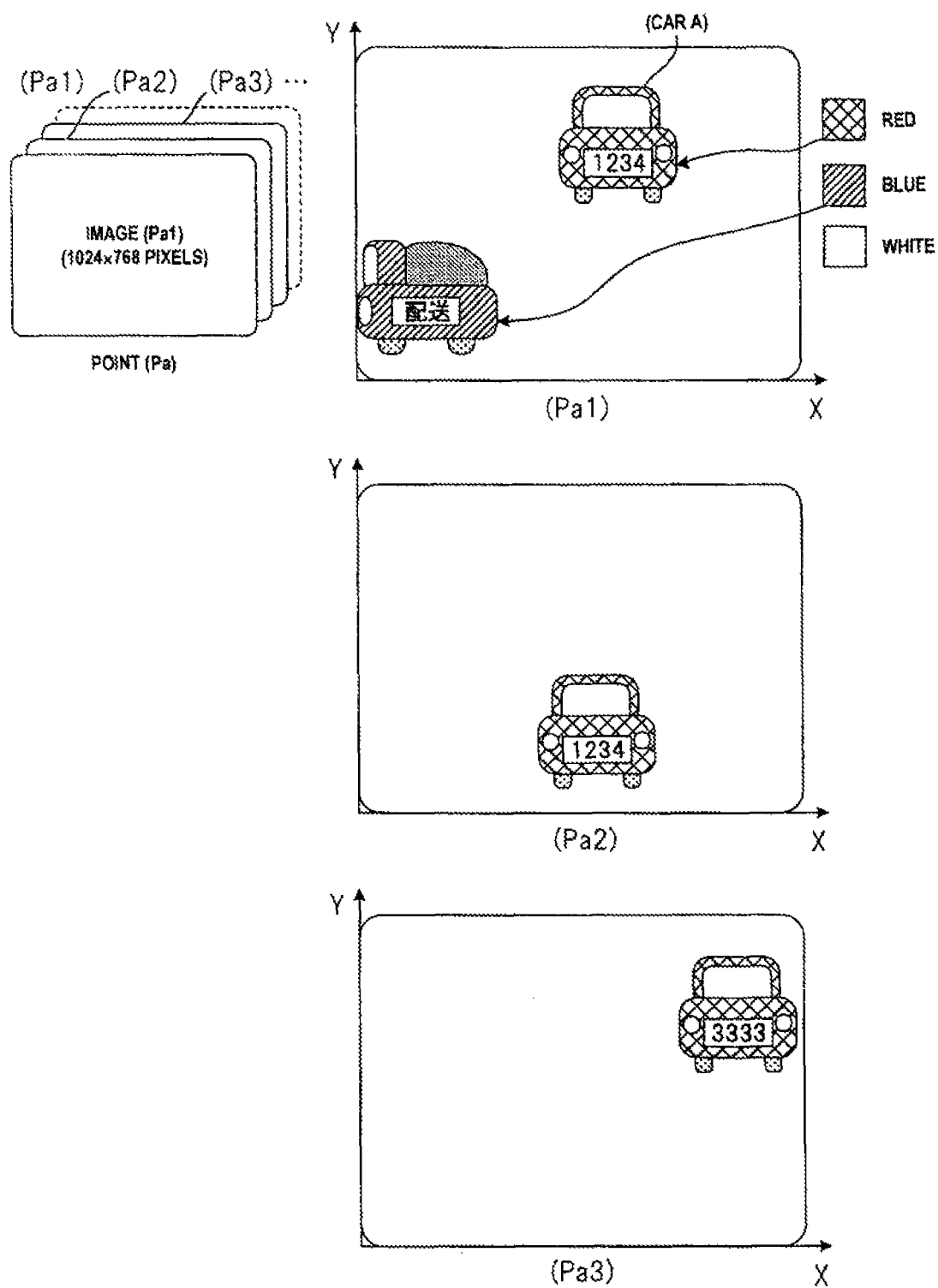
FIG. 2 is a schematic view showing an example of an image sequence photographed at one photographing point related to a pattern recognition apparatus according to a first embodiment.

Specifically, it is assumed that the pattern recognition apparatus is used to recognize a recognition object (car which travels on the road in this example) which appears in an image shown in FIG. 2, for example. FIG. 2 is a schematic view showing an example of an image sequence photographed at one photographing point related to the pattern recognition apparatus according to the first embodiment.

For images in which an object may be included, the image input section 101 inputs an image and supplementary information added thereto. The supplementary information includes information on the photographing position and photographing time of an image. The image input section 101 may be formed using a camera which periodically photographs a still image at a photographing position, which is fixed beforehand, at predetermined time intervals, for example. The image data storage section 102 stores images and supplementary information input in the image input section 101.

In the example shown in FIG. 2, it is assumed that a plurality of images (Pa1), (Pa2), (Pa3), . . . photographed in order at different points of time at one photographing point (Pa) are input sequentially from the image input section 101. In addition, in the example shown in FIG. 2, a pattern including a moving car appears in each of the images (Pa1), (Pa2), and (Pa3) which are still images.

FIG. 3 is a schematic view showing an example of the configuration of the supplementary information of an image sequence according to the first embodiment. In FIG. 3, a specific example of images and supplementary information corresponding to each image, which are stored in the image data storage section 102, when the image input section 101 inputs the image sequence shown in FIG. 2, is shown.

In the example shown in FIG. 3, not only an image but also the supplementary information indicating the photographing position (point) and the photographing time (time) is included for each of the plurality of images (Pa1), (Pa2), and (Pa3). The contents of the photographing position (point) of the supplementary information show that all of the plurality of images (Pa1), (Pa2), and (Pa3) shown in FIG. 3 are images photographed at the same photographing position (point). In addition, the contents of the photographing time (time) of the supplementary information show that the plurality of images (Pa1), (Pa2), and (Pa3) shown in FIG. 3 are images photographed at the slightly shifted times.

The character recognition section 103 recognizes a character pattern recorded in the image input in the image input section 101 and acquires, for every character pattern, a candidate character code indicating one or more corresponding candidate characters, an evaluation value (a value equivalent to the reliability or the like of a character recognition result) of each candidate character, and a recognition result including position coordinates and size of a character in an image. The character recognition result storage section 104 stores the character recognition result recognized in the character recognition section 103.

FIG. 4 is a schematic view showing an example of the configuration of the information of the character recognition result of the image sequence according to the first embodiment. In FIG. 4, a specific example of the character recognition result, which is recognized in the character recognition section 103 and stored in the character recognition result storage section 104 when the image input section 101 inputs the images and supplementary information shown in FIG. 3, is shown.

In the example shown in FIG. 4, for each of the plurality of images (Pa1), (Pa2), and (Pa3) shown in FIG. 2, information (104a) for distinguishing each character pattern, one or more candidate character codes (104b), an evaluation value (104c) of each candidate character, and information on position coordinates (104d) of the starting point and end point of a character pattern are stored for each character pattern.

For example, when the character recognition section 103 recognizes each character pattern of a number shown on a number plate of (car A) which is an object appearing in the image (Pa1) shown in FIG. 2, candidate character codes of "1", "2", "3", and "4" are respectively detected as character patterns (C7), (C8), (C9), and (C10) corresponding to the image (Pa1), and the evaluation value of each candidate and the information on the position coordinates are stored in the character recognition result storage section 104 as shown in FIG. 4. In addition, since the coordinates of the starting point and end point are included as the position coordinates of each character pattern, the size of a character pattern may also be detected.

The designation section 105 inputs the analysis conditions of an object. As specific analysis conditions, for example, it is assumed that a character string (for example, a number on a number plate) for specifying a recognition object is designated. The analysis section 106 analyzes the object by extracting the object character information relevant to the object using the character code and evaluation value, the position and size of the character, the photographing position and photographing time of the image, and the color information from the images and supplementary information, which are stored in the image data storage section 102, and the character recognition result, which is stored in the character recognition result storage section 104, on the basis of the analysis conditions input in the designation section 105.

The result output section 107 outputs the result analyzed in the analysis section 106.

Figure 5:
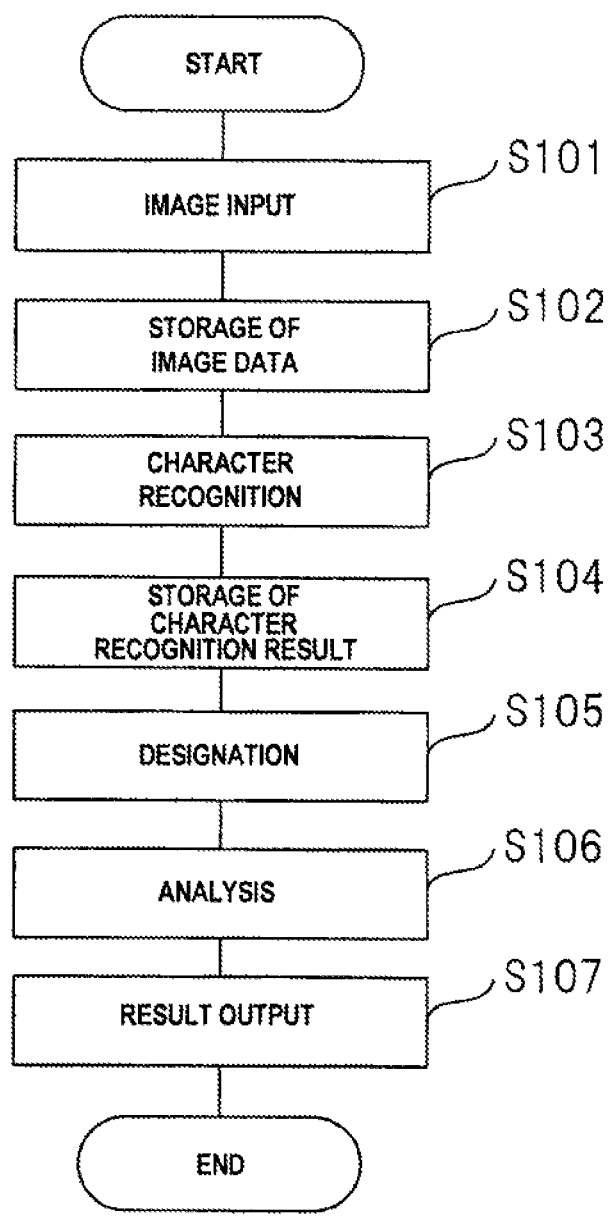
FIG. 5 is a flow chart showing the outline of the procedures of pattern recognition processing in the pattern recognition apparatus of the present embodiment.

Next, an operation of the pattern recognition apparatus of the present embodiment will be described. FIG. 5 is a flow chart showing the outline of the pattern recognition processing procedures in the pattern recognition apparatus of the present embodiment. The processing operation in the pattern recognition apparatus is according to the embodiment of the pattern recognition method of the present invention.

In image input step S101, the image input section 101 inputs an image and supplementary information which is related to the image and includes the photographing position and photographing time of the image, for an image in which an object may be included, and the process proceeds to S102.

In image data storage step S102, the image and the supplementary information which are input in image input step S101 are stored in the image data storage section 102, and the process proceeds to S103.

In character recognition step S103, the character recognition section 103 recognizes a character recorded in the image input in image input step S101 and acquires a recognition result including a candidate character code, the evaluation value, and the position and size of the character, and the process proceeds to S104.

In character recognition result storage step S104, the character recognition result recognized in character recognition step S103 is stored in the character recognition result storage section 104, and the process proceeds to S105.

In designation step S105, the analysis conditions of the object are input in the designation section 105, and the process proceeds to S106.

In analysis step S106, the analysis section 106 analyzes the object by extracting the object character information relevant to the object using the character code and evaluation value, the position and size of the character, the photographing position and photographing time of the image, and the color information from the images and supplementary information, which are stored in the image data storage step S102, and the character recognition result which is stored in the character recognition result storage step S104, on the basis of the analysis conditions input in the designation step S105, and the process proceeds to S107.

In result output step S107, the result output section 107 outputs the result analyzed in the analysis step S106.

Hereinafter, a specific example of the operation of the pattern recognition apparatus of the present embodiment will be described. Here, processing will be described in the case where the image sequence (Pa1), (Pa2), (Pa3), . . . shown in FIG. 2 is processed to thereby analyze the object (car A) appearing in these images.

In each image which is input in the image input section 101 and stored in the image data storage section 102, information on the photographing point and photographing time (time) is recorded as the supplementary information as shown in FIG. 3.

Moreover, in the information of the character recognition result which is recognized in the character recognition section 103 and stored in the character recognition result storage section 104, the candidate character code (104b), the evaluation value (104c) of each candidate, and the position coordinate (104d) of the starting point and end point of the character pattern are included for each character pattern in each image (Pa1, Pa2, Pa3) of the object to be processed, as shown in FIG. 4.

In the case of processing the image sequence (Pa1), (Pa2), (Pa3), shown in FIG. 2, in order to specify (car A) which object becomes a recognition object, the car number "1234" (of car A) may be input to the designation section 105 by an input operation of the manager, for example, and the car number "1234" may be designated from the designation section 105 as the analysis conditions (designated character string) of the object. Details of control of the analysis section 106 when such a designation is given are schematically shown in FIG. 6.

Figure 6:
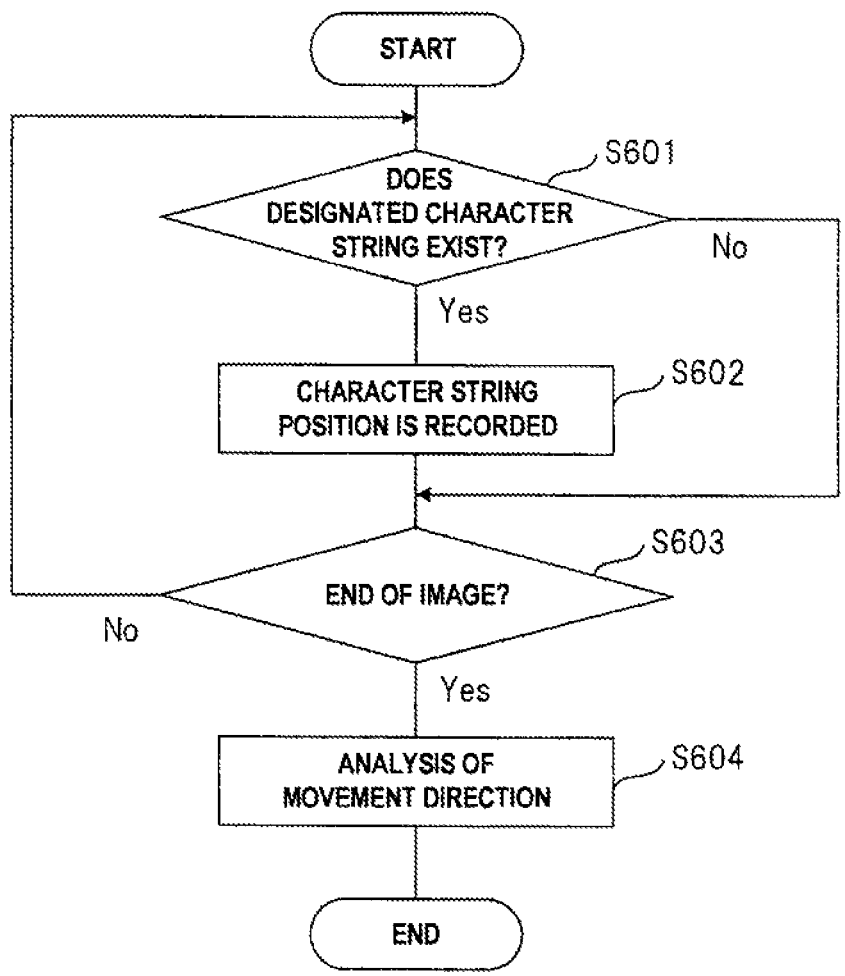
FIG. 6 is a flow chart showing the outline of the control procedures of an analysis section when a car number is designated in the pattern recognition apparatus according to the first embodiment.

FIG. 6 is a flow chart showing the outline of the control procedures of the analysis section when the car number is designated in the pattern recognition apparatus of the first embodiment. Hereinafter, details of the control processing in the analysis section 106 will be described.

In S601, the analysis section 106 determines whether or not a character string "1234" satisfying certain criteria, the evaluation value of which is less than 50, exists in a candidate character code of the character recognition result of the image (Pa1) referring to the contents (refer to FIG. 4) of the character recognition result storage section 104. If it exists, the process proceeds to S602. If it does not exist, the process proceeds to S603.

The analysis section 106 performs the processing shown in FIG. 6 on the basis of the image (Pa1) included in the contents shown in FIG. 4, and a result (recorded contents of each of regions 104e to 104h) shown in FIG. 7 can be obtained. FIG. 7 is a schematic view showing the configuration of the information of the processing result recorded for a character string which is an object in the first embodiment. The contents of the regions 104a to 104d shown in FIG. 4 and the contents of the regions 104a to 104d shown in FIG. 7 indicate the identical contents.

In the case where the character string "1234" has been designated as the analysis conditions, one character string (L1) configured by a group of four character patterns (C3), (C4), (C5), and (C6) can be detected when processing the image (Pa1) in S601, as shown in FIG. 7. Accordingly, the process proceeds to S602.

In S602, as the detection information corresponding to the character string (L1) of the image (Pa1), photographing time (104f), character image group (104g), and character string coordinates (104h) are stored in a region (104e) matched with the corresponding character string (L1) as shown in FIG. 7. Here, the information of the photographing time (104f) can be acquired from the contents of the image data storage section 102. The information of the character image group (104g) is recorded as a combination of elements, which express characters of the designated character string (L1), among the information (104a) of each character pattern recorded in the character recognition result storage section 104. That is, the character string (L1) expressing "1234" is recorded in the region 104g as a combination of the character patterns (C3), (C4), (C5), and (C6) shown in FIG. 7. In addition, the character string coordinates (104h) of the character string (L1) are recorded in the region 104h as coordinates of the starting point and end point of the entire character string calculated from the coordinates (contents of 104d) corresponding to the character patterns (C3) to (C6).

In S603, it is determined whether or not the processing has been performed for all images. If it has not been completed, the process proceeds to S601. If it has been completed, the process proceeds to S604.

By the processing of S602, the result is recorded in each of the regions 104e, 104f, 104g, and 104h shown in FIG. 7. In the example shown in FIG. 7, the case is assumed in which two character strings (L1) and (L2) can be detected. That is, the character string (L1) corresponding to the designated character string "1234" is detected from the image (Pa1) as a result of having processed the image (Pa1) and the character string (L2) corresponding to the designated character string "1234" is detected from the image (Pa2) as a result of having processed the image (Pa2), and these are recorded in the regions 104e to 104h.

In S604, the analysis section 106 determines the movement direction of the character string on the basis of criteria shown in FIG. 8, using the photographing time (contents of 104f) and character string coordinates (contents of 104h) of each of the character strings (L1, L2) that are detected. FIG. 8 is a schematic view showing the criteria for determining the movement direction of a character string which is an object used in the present embodiment.

Since (L1) and (L2) are detected as character strings corresponding to the same character string "1234" when the character recognition result shown in FIG. 7 is processed, it can be determined whether or not the character string (L1) and the character string (L2) indicate the identical object (car A). In addition, when they indicate the identical object (car A), the movement directions of these character strings (L1) and (L2) can be detected.

That is, since the strings (L1) and (L2) are extracted from the plurality of images (Pa1) and (Pa2) photographed at the same photographing position, the contents of the character strings are the same as the designated contents "1234". In addition, since a difference of photographing time between the images (Pa1) and (Pa2) is small, it can be determined that these are character strings indicating the identical object (car A).

In addition, a situation of the movement (equivalent to the movement of an object) regarding the character strings (L1) and (L2) can be determined by processing the information (contents of the regions 104e to 104h shown in FIG. 7) of the character strings (L1) and (L2) on the basis of the criteria shown in FIG. 8.

In the criteria shown in FIG. 8, six kinds of criteria, "leftward movement", "rightward movement", "downward movement", "upward movement", "forward movement", and "backward movement", are specified. The character strings (L1) and (L2) in FIG. 7 are equivalent to (La) and (Lb) shown in FIG. 8, respectively, due to the difference in photographing time. That is, a character string detected from an image whose photographing time is relatively earlier corresponds to the character string (La) in FIG. 8, and a character string detected from an image whose photographing time is relatively later corresponds to the character string (Lb) in FIG. 8. The meaning of each parameter shown in FIG. 8 is as follows:

LaYs: Starting point Y coordinate position of a pattern of the character string (La)
LaYe: End point Y coordinate position of a pattern of the character string (La)
LaXs: Starting point X coordinate position of a pattern of the character string (La)
LaXe: End point X coordinate position of a pattern of the character string (La)
LbYs: Starting point Y coordinate position of a pattern of the character string (Lb)
LbYe: End point Y coordinate position of a pattern of the character string (Lb)
LbXs: Starting point X coordinate position of a pattern of the character string (Lb)
LbXe: End point X coordinate position of a pattern of the character string (Lb)

As shown in FIG. 8, the starting point expresses the upper left end coordinates of the pattern in the image, and the end point expresses the lower right end coordinates.

For example, as a result that the analysis section 106 checks the compatibility with the criteria shown in FIG. 8 for the character strings (L1) and (L2), which are the contents of the regions 104e to 104h shown in FIG. 7, the conditions of downward movement are satisfied. That is, since all the conditions of (LbYs<LaYs), (LbYe<LaYe), (LbXs≅LaXs), and (LbXe≅LaXe) are satisfied, it can be determined that the character strings (L1) and (L2) equivalent to the designated character string "1234" are moving downward. Accordingly, it can be analyzed that the object (car A) is moving downward.

As described above, the movement state of an object, such as upward, downward, leftward, rightward, forward, backward, and appearance and disappearance, can be analyzable by using the position or size of a character indicating the object.

Second Embodiment

Next, an example of performing pattern recognition by processing images photographed at a plurality of points is shown as a second embodiment. In the first embodiment described above, the case is assumed in which the plurality of images (Pa1), (Pa1), and (Pa3) photographed at the same point is processed as shown in FIG. 2. Alternatively, it is also possible to perform pattern recognition by processing images photographed at a plurality of points (Pb), (Pc), and (Pd) as in the following second embodiment.

Figure 9:
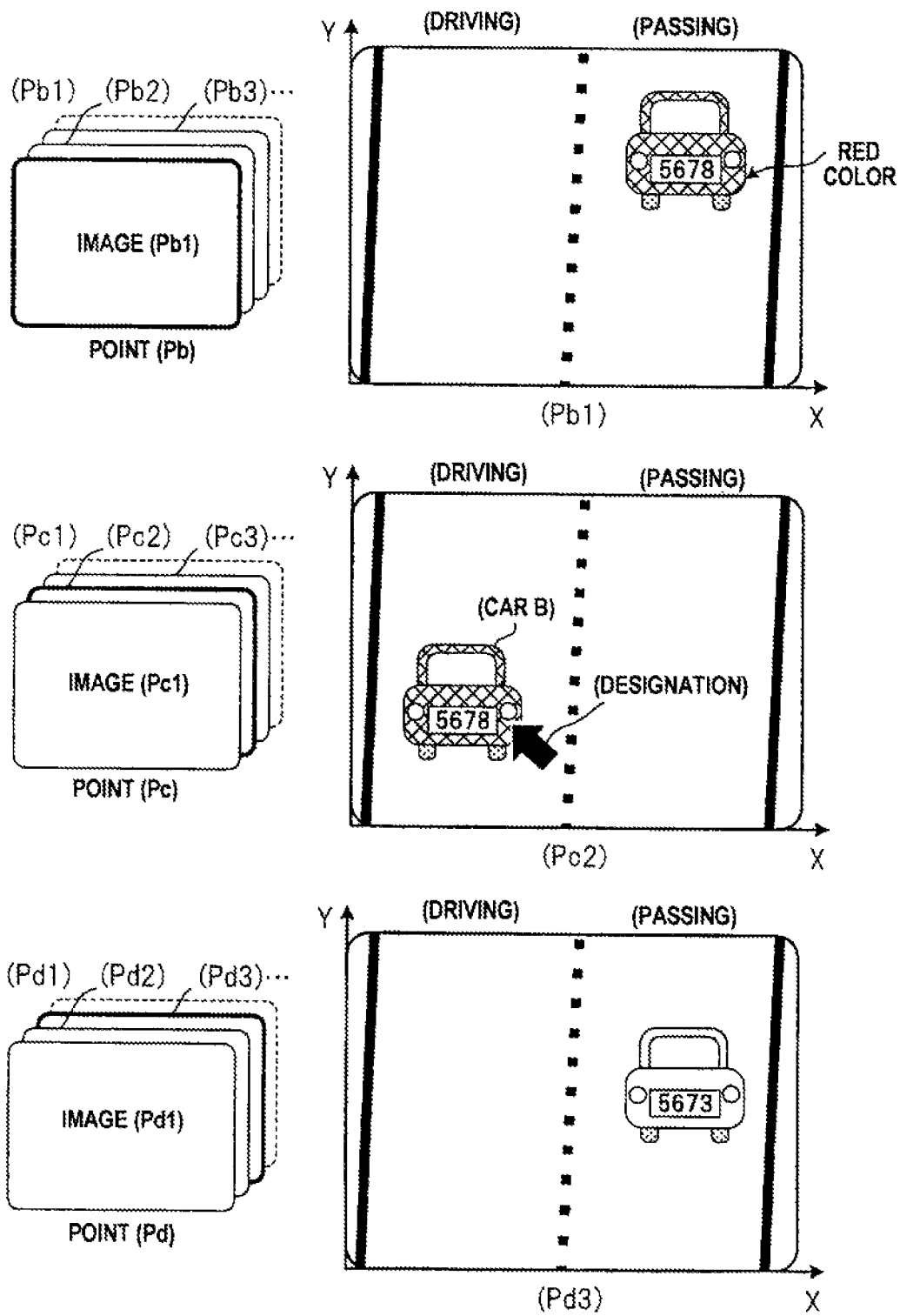
FIG. 9 is a schematic view showing an example of an image sequence photographed at three photographing points related to a pattern recognition apparatus according to a second embodiment.

FIG. 9 is a schematic view showing an example of an image sequence photographed at three photographing points related to a pattern recognition apparatus of the second embodiment. Here, it is assumed that the three photographing points (Pb), (Pc), and (Pd) are on the same highway and the inbound lane appears in order of the photographing points (Pb), (Pc), and (Pd). Hereinbelow, the case will be described in which an object (car B) photographed in an image sequence of FIG. 9 is analyzed. The configuration of the pattern recognition apparatus is the same as that shown in FIG. 1, and an explanation thereof will be omitted herein.

FIG. 10 is a schematic view showing an example of the configuration of the supplementary information of an image sequence according to the second embodiment. In FIG. 10, a specific example of images and supplementary information corresponding to each image, which are stored in the image data storage section 102, when the image input section 101 inputs the image sequence shown in FIG. 9, is shown. In this example, the distance from the starting point (distance from the specific starting position) of a photographing point and the photographing time are recorded in the supplementary information.

FIG. 11 is a schematic view showing an example of the configuration of the information of the character recognition result of the image sequence according to the second embodiment. In FIG. 11, a specific example of the character recognition result, which is recognized in the character recognition section 103 and stored in the character recognition result storage section 104 when the image input section 101 inputs the images and supplementary information shown in FIG. 10, is shown. In this case, information (104a) for distinguishing each character pattern, a candidate character code (104b) of each candidate, an evaluation value (104c) of each candidate, and position coordinates (104d) of the starting point and end point of characters are recorded for all characters within each image.

In this example, it is assumed that a manager who operates the pattern recognition apparatus can designate a photographing point and an object appearing in a specific image by operating the designation section 105. Details of control of the analysis section 106 when such designation is performed are schematically shown in FIG. 12.

Figure 12:
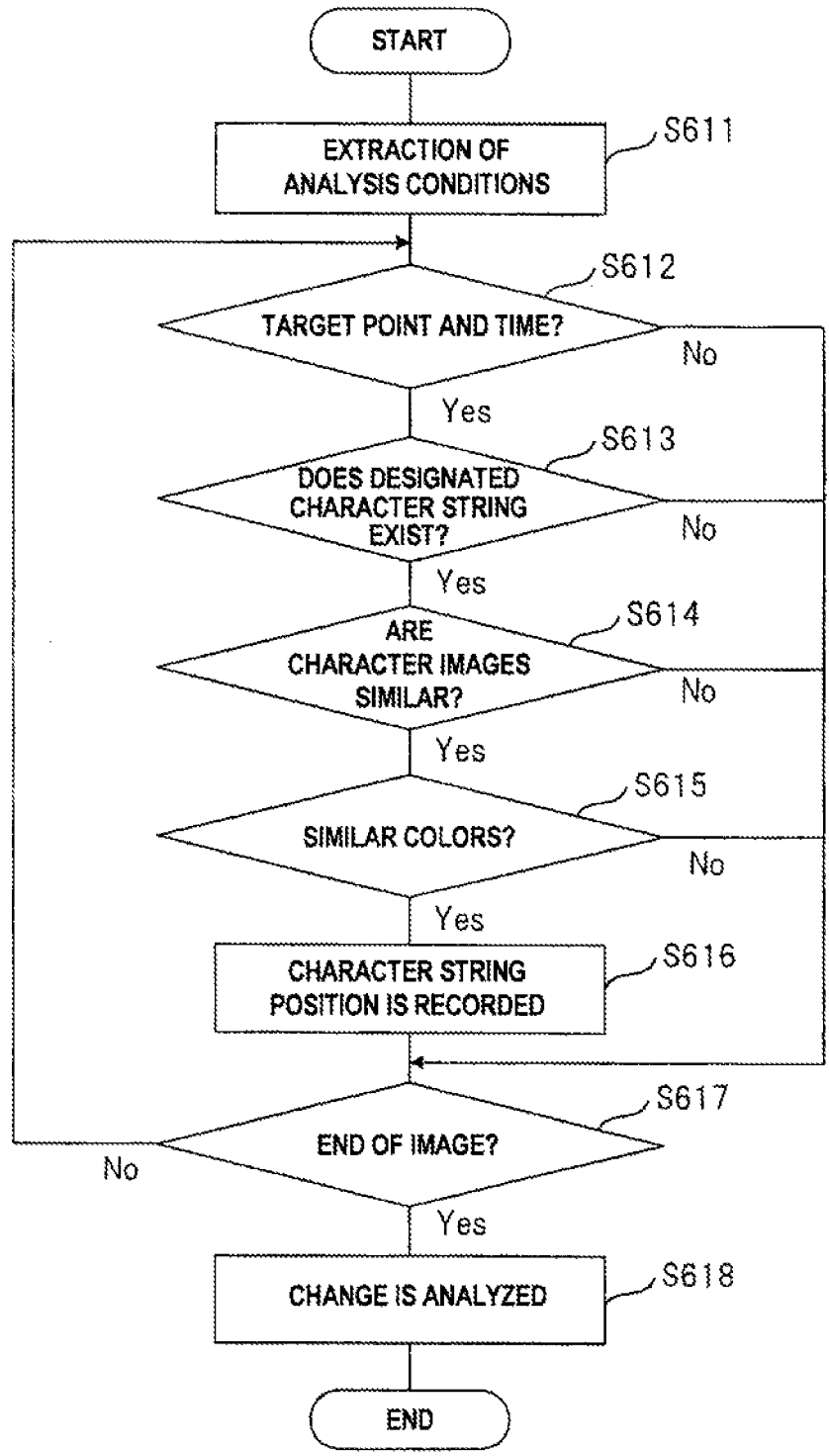
FIG. 12 is a flow chart showing the outline of the control procedures of an analysis section when an object has been designated in the pattern recognition apparatus of the second embodiment.

FIG. 12 is a flow chart showing the outline of the control procedures of the analysis section when an object has been designated in the pattern recognition apparatus of the second embodiment. Here, details of the control processing in the analysis section 106 will be described when a manager designates an object (car B in FIG. 9), which appears in the image (Pc2) of the image sequence of the photographing point (Pc), by using the designation section 105.

In S611, the analysis conditions are extracted. For example, photographing time 10:00 (refer to FIG. 10) of the image (Pc2) designated by the manager; character strings "5673" and "5678" satisfying certain criteria in which the evaluation value (contents of 104c) is less than 50 among candidate character codes (contents of 104b) included in the character recognition result (some contents of FIG. 11) of a neighboring region of the object designated by the manager, a character image group (C21, C22, C23, C24) corresponding to the character string "5673" and a character image group (C21, C22, C23, C24) corresponding to the character string "5678"; and <red> which is a background color around the character position corresponding to the character string "5678" and <red> which is a background color around the character position corresponding to the character string "5673" become the analysis conditions.

In S612, it is determined whether or not it is an image to be determined from the relationship between the photographing time condition and the position of the point. If it is an object image, the process proceeds to S613. If it is not an object image, the process proceeds to S617. Specifically, in consideration of the fact that the movement direction of a car is set beforehand in each lane on the road and a time taken for the movement between a plurality of photographing points (it takes 30 minutes for the movement of 50 km), objects at the photographing point (Pb) are limited only to the image photographed before the image (Pb1) photographed 30 minutes earlier from the photographing time of the image (Pc2) (refer to FIG. 10). In addition, objects at the photographing point (Pc) are images photographed before and after the image (Pc2). Objects at the photographing point (Pd) are limited only to an image photographed after the image (Pd3) in consideration of the time taken for the movement between photographing points.

The analysis section 106 performs the processing shown in steps S613 to S616 of FIG. 12 on the basis of the information (contents of the image data storage section 102) shown in FIG. 10 and the information (contents of the character recognition result storage section 104) shown in FIG. 11, and a result (recorded contents of each of regions 104e to 104j) shown in FIG. 13 can be obtained. FIG. 13 is a schematic view showing the configuration of the information of a processing result recorded for a character string which is an object in the second embodiment. In addition, the contents of the regions 104a to 104d shown in FIG. 11 and the contents of the regions 104a to 104d shown in FIG. 13 are the same.

In S613, the analysis section 106 determines whether or not the character strings "5673" and "5678", which satisfy certain criteria in which the evaluation value is less than 50, exist in candidate character codes of the character recognition result for images which are sequentially input. If it exists, the process proceeds to S614. If it does not exist, the process proceeds to S617.

As shown in FIG. 13, the character string "5678" to be checked is detected from the image (Pb1) as a character string (L11), which is a group of four character patterns (C11), (C12), (C13), and (C14), and is detected from the image (Pc2) as a character string (L12), which is a group of four character patterns (C21), (C22), (C23), and (C24).

In addition, the character string "5673" to be checked is detected from the image (Pc2) as a character string (L21), which is a group of four character patterns (C21), (C22), (C23), and (C24), and is detected from the image (Pd3) as a character string (L22), which is a group of four character patterns (C31), (C32), (C33), and (C34).

In S614, similarities between the character image group (C21, C22, C23, C24) corresponding to the character string "5678" and the character image group (C21, C22, C23, C24) corresponding to the character string "5673" are calculated for the character image groups of the detected character strings (L11), (L12), (L21), and (L22). If the similarities satisfy certain criteria, the process proceeds to S615. If the certain criteria are not satisfied, the process proceeds to S617. The similarities are calculated in the same method as the method of calculating the evaluation value of the character recognition in the character recognition section 103. In the example shown in FIG. 13, the similarities satisfy the criteria for the character strings (L11), (L12), (L21), and (L22). Accordingly, the process proceeds to S615.

In S615, for character strings which are sequentially input, a background color around the corresponding character position is detected from the image. If it is a similar color, the process proceeds to S616. If it is not a similar color, the process proceeds to S617.

For example, for both the character strings (L11) and (L12) of the character string "5678", the background color detected from the image is red. Accordingly, they are recorded as <red> in the region 104j shown in FIG. 13. Accordingly, when the character strings (L11) and (L12) are compared with each other, it is determined that these are similar colors, and the process proceeds to S616.

On the other hand, the character string (L21) of the character string "5673" is recorded as <red> in the region 104j of FIG. 13, and the character string (L22) is recorded as <white> in the region 104j. Accordingly, when the character strings (L21) and (L22) are compared with each other, it is determined that both backgrounds are not similar colors, and the process proceeds to S617.

By comparing background colors of images of character strings as described above, it becomes easy to distinguish a plurality of cars by the difference of colors of bodies of the cars even if a plurality of cars with similar car numbers (display contents of number plates) exists, for example, when the objects to be recognized are cars.

In S616, for the plurality of character strings (L11) and (L12) which is eventually considered to be effective information (similar to each other since the relevance with the designated objects is high) in S612 to S615, the information on distances from the starting point, photographing time, character image groups, character string coordinates, and background colors are stored.

For example, since it is determined that the relevance of both the character strings (L11) and (L12) indicating the character string "5678" recorded in the region 104e shown in FIG. 13 is high, the information on the distance from the starting point, photographing time, character image group, character string coordinates, and background color recorded in the regions 104f, 104g, 104h, 104i, and 104j is recorded as effective information in S616.

On the other hand, since it is determined that the relevance of both the character strings (L21) and (L22) indicating the character string "5673" recorded in the region 104e shown in FIG. 13 is low due to influences such as the difference in background color, these are not recorded as effective information.

In S617, it is determined whether or not the processing has been performed for all images. If it has not been completed, the process proceeds to S612. If it has been completed, the process proceeds to S618.

In S618, for every character string of the analysis condition, the movement state of the character string is determined from the distance from the starting point, photographing time, and character string coordinates of each detected character string (L) and the result is set as the movement state of the object.

For example, when an object (for example, the car B shown in FIG. 9) is analyzed on the basis of the information (equivalent to the contents of the regions 104e, 104f, 104g, 104h, 104i, and 104j) of the effective character strings (L11) and (L12) shown in FIG. 13, it can be analyzed that the object (car B) passed through a passing lane (seen from the position coordinates of the region 104i) of the photographing point (Pb) at time 9:30, passed through a driving lane of the photographing point (Pc) at time 10:00, and has not yet reached the photographing point (Pd).

As described above, the movement state of an object can be analyzed in detail and correctly over a larger range by using the photographing position and photographing time of an image, similarities of character images, or color information in addition to the contents, position, or size of characters (car number, advertisement display, or the like) indicating an object, such as a car.

In addition, although it is assumed that a pattern, which is photographed simultaneously with an object and indicates the object, is a character string in the present embodiment, a pattern with the same characteristic as a character, such as a logo or a mark, may also be used. The various conditions in each processing are not limited if they are the same criteria.

In addition, each functional block shown in FIG. 1, such as the image input section, the image data storage section, the character recognition section, the character recognition result storage section, and the analysis section, may be typically realized as an LSI which is an integrated circuit. The technique of circuit integration is not limited to the LSI. Each of them may be individually made as one chip, or they may be made as one chip so as to include some or all sections. In this case, each function may be realized by processing based on an operation of a hardware circuit in the LSI or an operation of a predetermined software program on a processor.

In addition, the processing steps of the functions shown in FIGS. 5, 6, and 12 may be described in a computer executable program, or each function may be realized by execution of a program. In addition, it may be executed by reading a program into a computer from a suitable recording medium (for example, a CD-ROM or a DVD disk).

As described above, according to the present embodiment, even in the case where character patterns indicating the identical object appear in a plurality of images in a state where the positions or the sizes are different from each other, a common character pattern may be treated as a pattern indicating the identical object. Accordingly, by analyzing a change in character patterns indicating the identical object, a change in the object indicated by the character pattern can be analyzed. For example, the present embodiment may be applied to an analyzer of an image photographed by a surveillance camera or the like, a broad range monitoring system, and the like.

Third Embodiment

Figure 14:
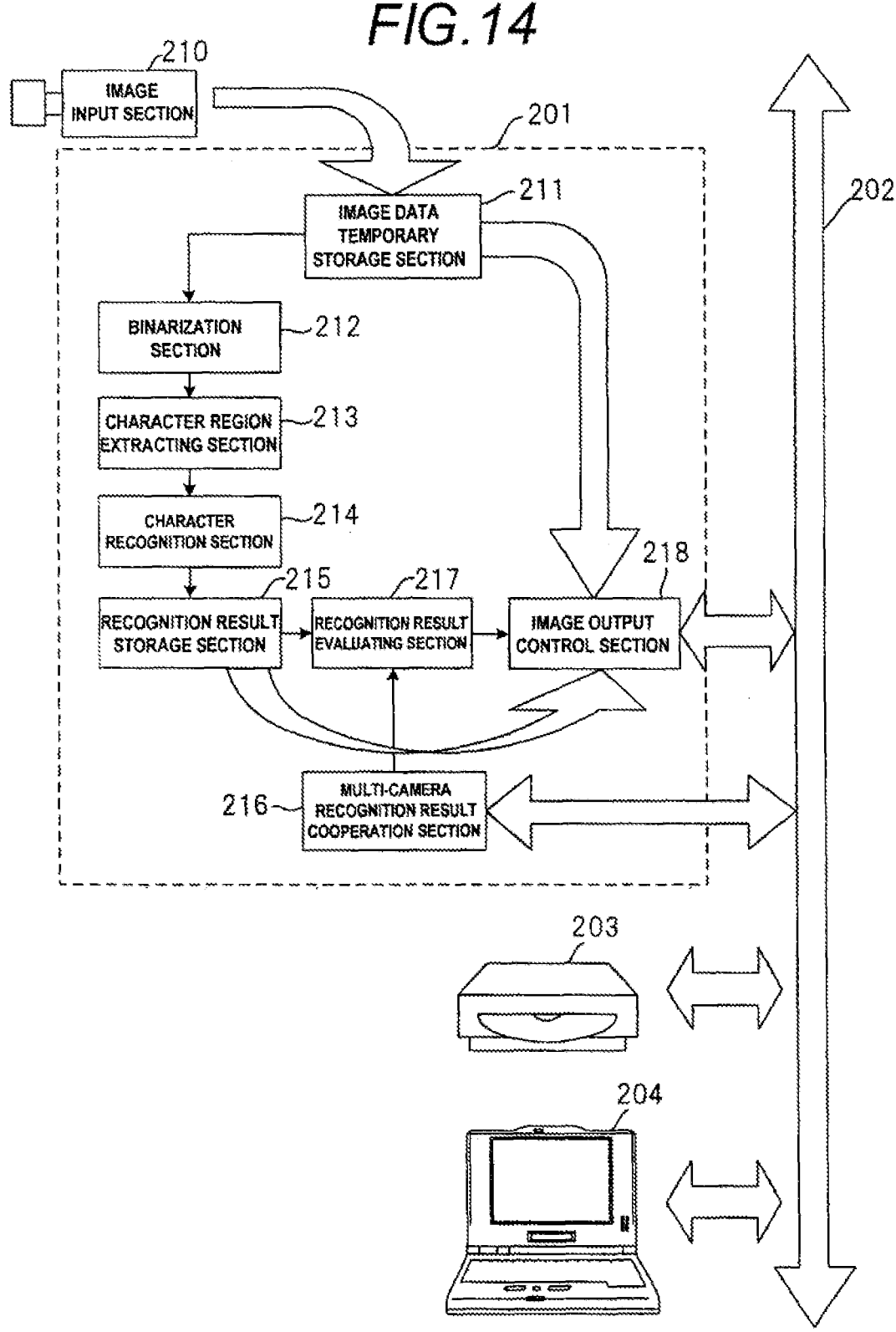
FIG. 14 is a block diagram showing the schematic configuration of an image processing apparatus according to a third embodiment of the present invention.

FIG. 14 is a block diagram showing the schematic configuration of an image processing apparatus according to a third embodiment of the present invention. In this drawing, an image processing apparatus 201 of the present embodiment includes an image data temporary storage section 211, a binarization section 212, a character region extracting section 213, a character recognition section 214, a recognition result storage section 215, a multi-camera recognition result cooperation section 216, a recognition result evaluating section 217, and an image output control section 218. The image processing apparatus 201, an external image storage medium 203, and a monitoring center 204 are connected to each other through a network 202. In addition, the image processing apparatus 201 may be not only one set but also two or more sets. In addition, the external image storage medium 203 may be not only one set but also two or more sets. In this case, it is needless to say that the plurality of image processing apparatuses 201 and the plurality of external image storage medium 203 are connected through the network 202. An image input section 210 inputs an image and supplementary information, which is related to the image and includes the photographing position and photographing time of the image, continuously to the image processing apparatus 201.

In the image processing apparatus 201, the image data temporary storage section 211 stores the image and the supplementary information including the photographing position and photographing time of the image, which are input from the image input section 210, by a number of times determined beforehand. The binarization section 212 binarizes the image stored in the image data temporary storage section 211 and transmits the binarized image to the character region extracting section 213. The character region extracting section 213 extracts the character region from the binarized image and transmits the coordinates of an individual character of the extracted character region to the character recognition section 214. The character recognition section 214 recognizes the characters in the image on the basis of the binary image and the character coordinates. The character recognition section 214 obtains a recognition result including a candidate character code, an evaluation value, and the character coordinates by character recognition processing. The recognition result storage section 215 holds the recognition result obtained in the character recognition section 214. The recognition result storage section 215 holds a plurality of recognition results. The multi-camera recognition result cooperation section 216 holds a plurality of supplementary information and recognition results obtained in other image processing apparatuses 201 connected through the network 202.

The recognition result evaluating section 217 determines whether or not the image held in the image data temporary storage section 211 is to be recorded in the external image storage medium 203 on the basis of the recognition result, which is held in the recognition result storage section 215 and is obtained in the corresponding image processing apparatus 201, and the recognition result, which is held in the multi-camera recognition result cooperation section 216 and is obtained in each of the plurality of other image processing apparatuses 201. When the recognition result evaluating section 217 determines that the image held in the image data temporary storage section 211 is to be recorded, the image output control section 218 records the image and the supplementary information related to the image, which are held in the image data temporary storage section 211, and the recognition result of the corresponding image, which is held in the recognition result storage section 215, in the external image storage medium 203.

Figure 15:
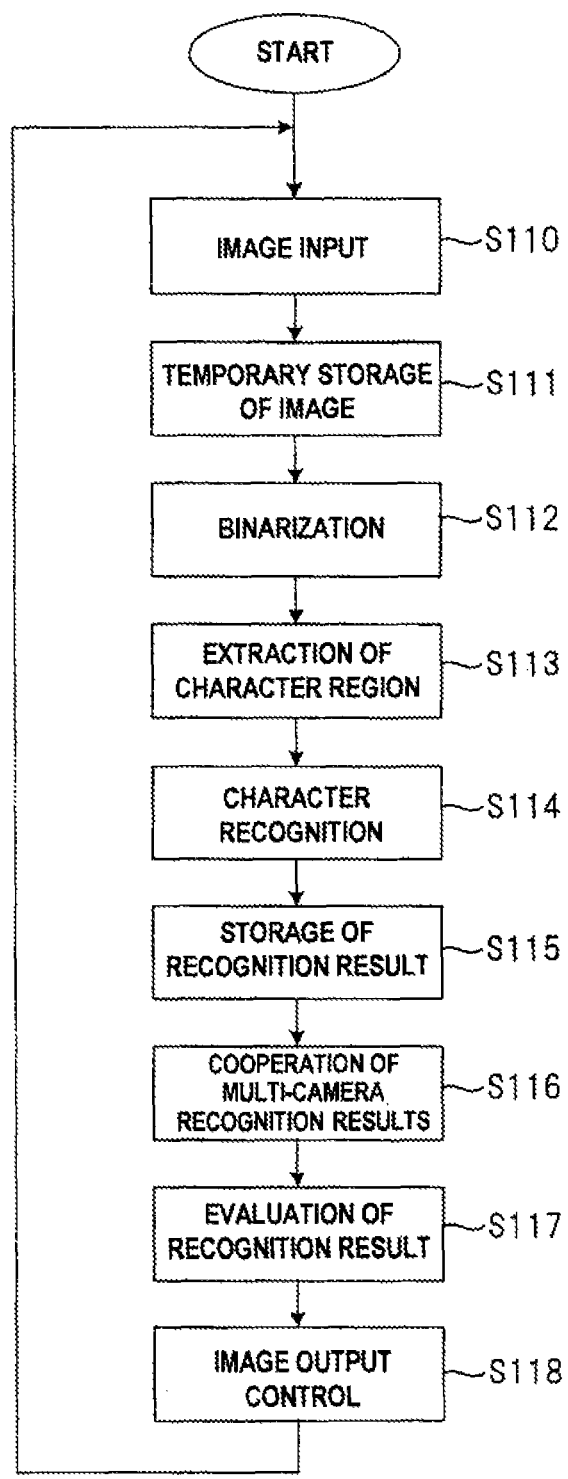
FIG. 15 is a flow chart showing an operation of the image processing apparatus of FIG. 14.

FIG. 15 is a flow chart showing an operation of the image processing apparatus 201 with the above-described configuration. In this drawing, an image and supplementary information, which includes the photographing position and photographing time of the image, are continuously input (step S110). Then, the image and the supplementary information which are input in image input step S110 are temporarily stored (step S111). Then, the image that is temporarily stored is binarized (step S112). Then, a character region is extracted from the binarized image, and the coordinates of an individual character of the extracted character region are acquired (step S113). Then, the character in the image is recognized on the basis of the binary image and the character coordinates (step S114). A recognition result including a candidate character code, an evaluation value, and the character coordinates is acquired by character recognition processing.

Then, the recognition result obtained in the step of character recognition is held (step S115). Here, a plurality of past recognition results are also held. Then, the plurality of supplementary information and recognition results obtained in other image processing apparatuses 201 connected through the network 202 are held (step S116). Then, it is determined whether or not the image held in the step of image temporary storage is to be recorded in the external image storage medium 203 on the basis of the recognition result, which is held in the step of recognition result storage and is obtained in the corresponding image processing apparatus 201, and the recognition result, which is held in the step of multi-camera recognition result cooperation and is obtained in the plurality of other image processing apparatuses 201 (step S117). Then, when it is determined that the image is to be recorded in the step of recognition result evaluation, the image and the supplementary information held in the step of image temporary storage and the recognition result of the image held in the step of recognition result storage are recorded in the external image storage medium 203 (step S118). When the above processing steps are completed, the processing is repeated again from step S110 of image input.

Figure 16:
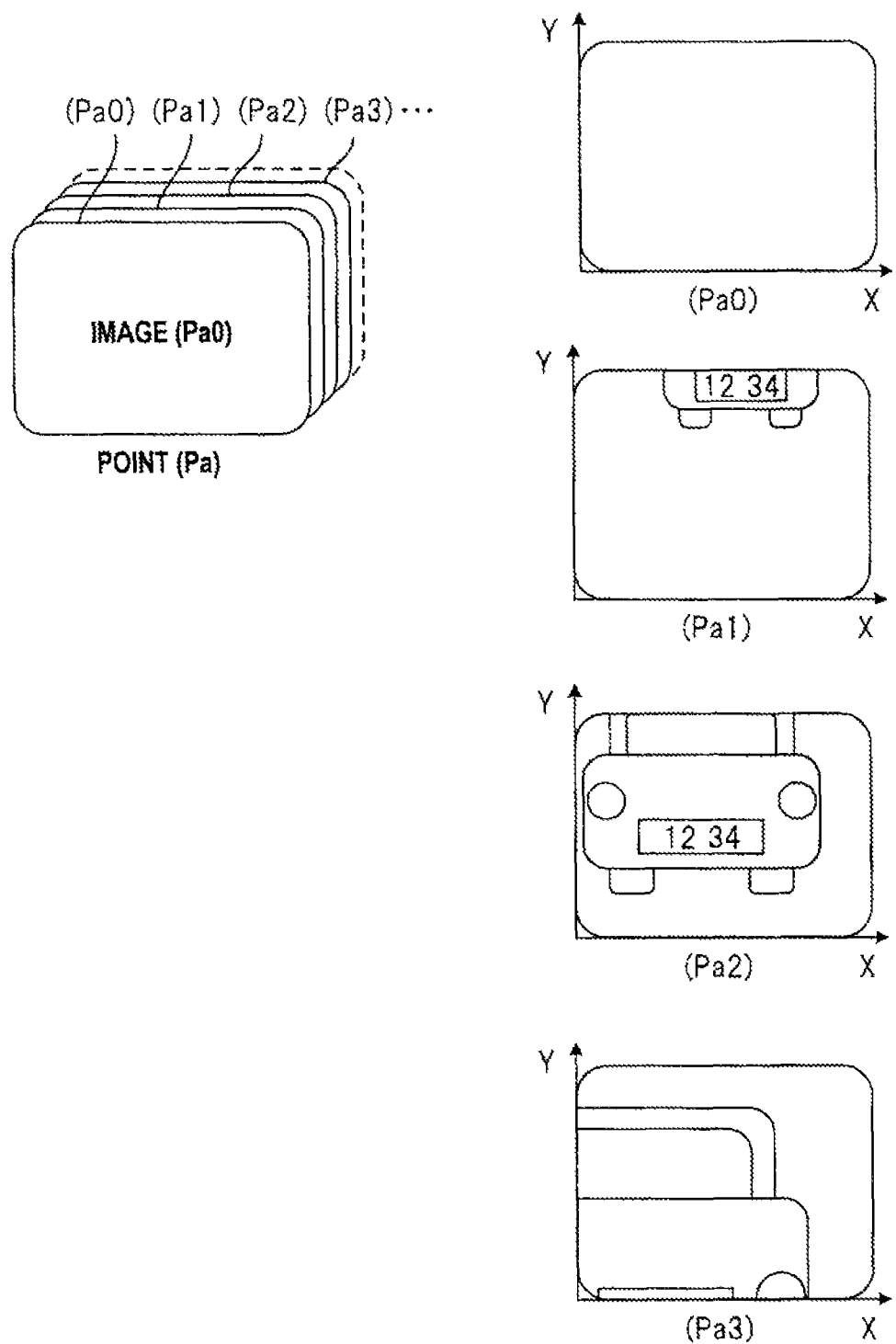
FIG. 16 is a view for explaining an image sequence photographed at one photographing point in the image processing apparatus of FIG. 14.

Next, an operation of the image processing apparatus 201 of the present embodiment will be described in detail. FIG. 16 is an explanatory view of an image sequence photographed at one photographing point (Pa). The case where images (Pa0), (Pa1), (Pa2), . . . are input in this order in the image input section 210 will be described as an example. FIG. 17 is an explanatory view of images and supplementary information stored in the image data temporary storage section 211. The images and the photographing points and photographing time input from the image input section 210 are recorded a number of times set beforehand. The oldest data is deleted when newly recording an image. FIG. 17 shows the contents of the image data temporary storage section 211 at a point of time when the newest image (Pa2) has been recorded.

Figure 19:
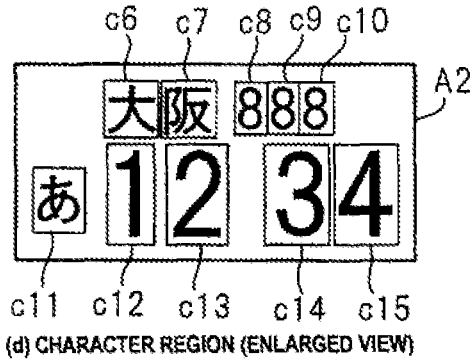
FIG. 19 is a view for explaining a character recognition process in the image processing apparatus of FIG. 14.

FIGS. 18 and 19 are explanatory views of the recognition process of the newest image (Pa2) recorded in the image data temporary storage section 211. (a) in FIG. 18 is the newest image (Pa2) in the image data temporary storage section 211. (b) in FIG. 18 is an image obtained when (a) of FIG. 18 is binarized by the binarization section 212. (c) in FIG. 18 shows a character region (A2) extracted by the character region extracting section 113 and characters in the character region (A2). (d) in FIG. 19 is an enlarged view of the extracted character region (A2). (e) in FIG. 19 shows the character coordinate data extracted in the character region extracting section 213. (f) in FIG. 19 shows a character recognition result output in the character recognition section 114.

When the newest image (Pa2) ((a) in FIG. 18) from the image input section 210 is recorded in the image data temporary storage section 211, the binarization section 212 performs binarization processing to create a binary image ((b) in FIG. 18). Then, the character region extracting section 213 extracts the character region and the individual character coordinates from the binary image ((b) in FIG. 18).

Figure 20:
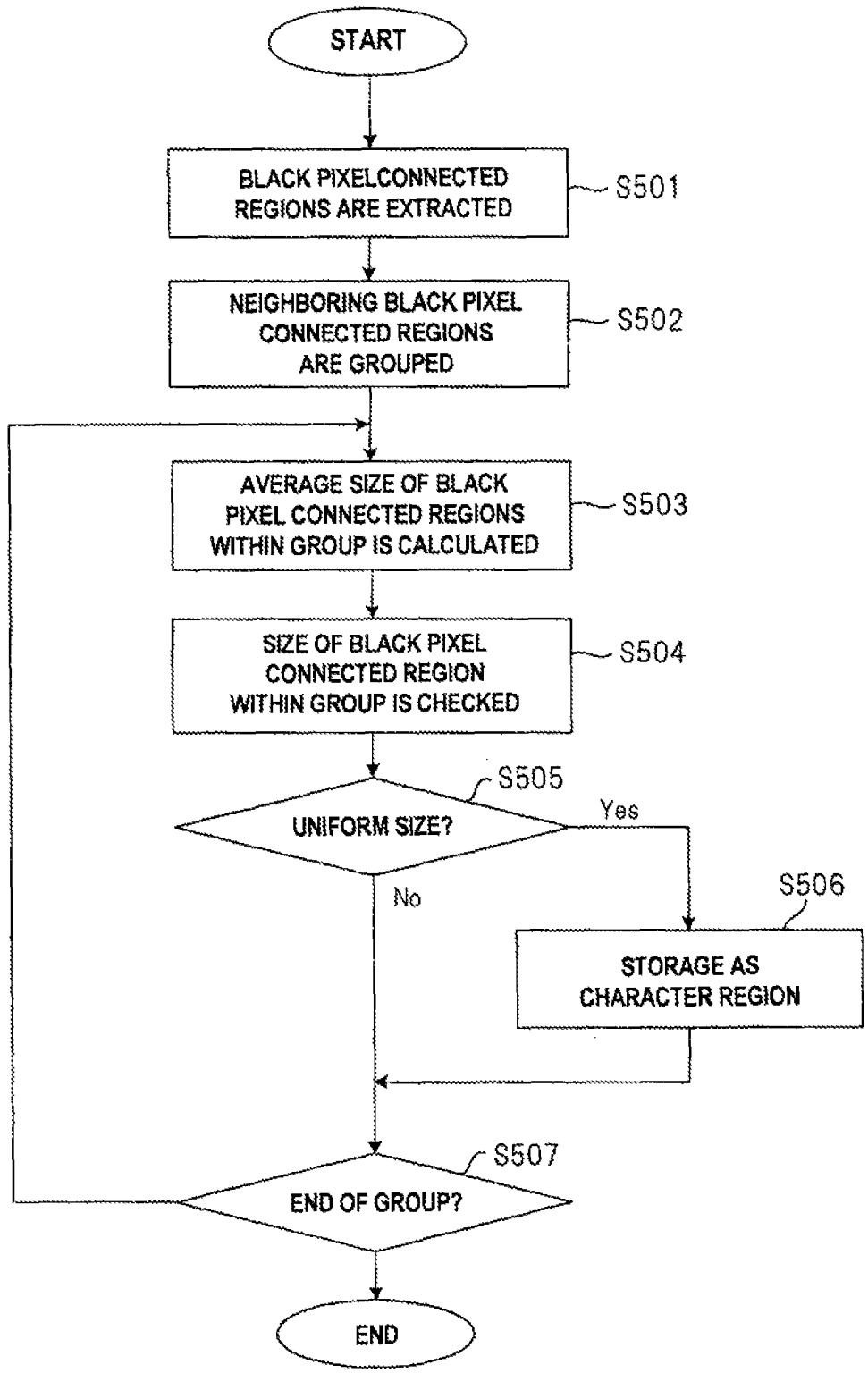
FIG. 20 is a flow chart showing the processing of a character region extracting section of the image processing apparatus of FIG. 14.

FIG. 20 is a flow chart showing the outline of processing of the character region extracting section 213. In this drawing, the character region extracting section 213 extracts black pixel connected regions from the binary image created by the binarization section 212 (step S501). Then, the regions positioned close to each other among the extracted black pixel connected regions are collected for division into groups (step S502). Then, the average size of the black pixel connected regions within the group is calculated for every group (step S503), and it is checked whether or not there is a black pixel connected region in the group, which is largely different from the average size (step S504). Then, it is determined whether or not the sizes of all black pixel connected regions in the group are uniform (step S505). When it is determined that they are uniform, it is determined that the group is a character region, the character coordinates are calculated from each black pixel connected region, and characters are collectively recorded on the basis of the calculated character coordinates for every character string (step S506). On the other hand, it is determined that a group including a non-uniform black pixel connected region is not a character region. The processing of steps S503 to S506 is performed for all groups.

The character coordinates ((e) of FIG. 19) acquired in the character region extracting section 213 as described above are transmitted to the character recognition section 214, and the character recognition section 214 performs character recognition on the basis of the character coordinates. By this character recognition, the recognition result of (f) in FIG. 19 can be obtained. In addition, the character recognition processing is processing which generally takes time to do the processing, and the processing time becomes longer according to the number of characters to be recognized. In the case where numbers and Japanese hiragana (of which there are about 60 characters) are set as objects to be recognized, the processing time that is required is several times that of the case where only numbers (ten characters) are set as objects to be recognized. When kanji characters, of which there are 3000 or more, are set as objects to be recognized, the processing time that is required is 100 times or more that in the case of only numbers. Here, the type of character to be recognized is limited to numbers assuming that the image input interval in the image input section 210 is short. However, when the image input interval in the image input section 210 is sufficiently longer compared with the recognition processing time, even the Japanese hiragana and kanji characters may be set as objects to be recognized.

FIGS. 21 and 22 are explanatory views of a recognition result held in the recognition result storage section 215. In these drawings, a recognition result (candidate character code, evaluation value, character coordinates) of a plurality of images recorded in the image data temporary storage section 211 is held. The evaluation value is a value indicating the probability of a candidate character code obtained as a recognition result. In the present embodiment, the evaluation value indicates values of 0 to 100, and it means that the smaller the number is, the more probable the candidate character is. The oldest data is deleted when newly recording a recognition result. FIG. 21 shows the contents of the recognition result storage section 215 at a point of time when a recognition result (R2) of the image (Pa2) is recorded, and FIG. 22 shows the contents of the recognition result storage section 215 at a point of time when the next image is input from the image input section 210 and the image (Pa3) is the newest image. Since no character is included in the image (Pa3), the recognition result is blank.

The recognition result evaluating section 217 selects an image recorded in the external image storage medium 203 on the basis of the contents of the recognition result storage section 215. Hereinafter, processing of the recognition result evaluating section 217 will be described using as an example the case where the contents of the recognition result storage section 215 are that like FIG. 22.

Figure 23:
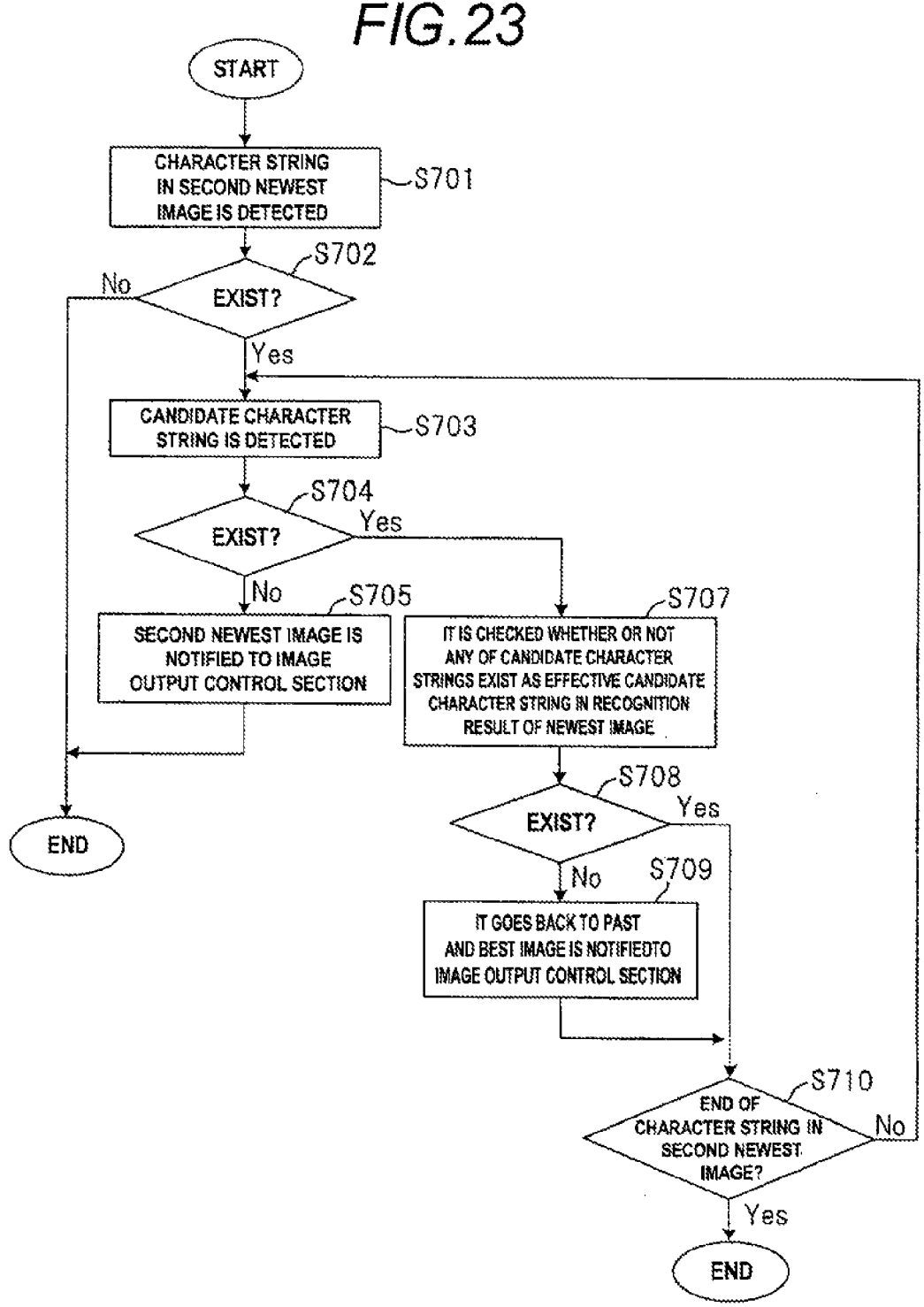
FIG. 23 is a flow chart showing the processing of a recognition result evaluating section of the image processing apparatus of FIG. 14.

FIG. 23 is a flow chart showing the outline of the processing of the recognition result evaluating section 217. The recognition result evaluating section 217 executes a series of processing shown in FIG. 23 when a new recognition result is recorded in the recognition result storage section 215. In this drawing, a character string in a second newest image ((Pa2) in the case of FIG. 22) is detected (step S701). Then, it is determined whether or not a character string has been detected (step S702). When a character string could not be detected, the processing of the recognition result evaluating section 217 ends. When a character string could be detected (character strings (L2) and (L3)), an effective candidate character string is detected (step S703). Here, a sequence of character codes whose evaluation values are less than 50 is determined to be an effective candidate character string. In the case of FIG. 22, it is detected that an effective candidate character string for the character string (L2) is "888" and candidate character strings for the character string (L3) are four of "1234", "1284", "-234", and "-284".

Then, it is determined whether or not there is a detected effective candidate character string (step S704). When an effective candidate character string cannot be detected, the second newest image is notified to the image output control section 218 (step S705). This is because an image, for which a recognition result with a satisfactory evaluation value is not obtained even though a character is detected, is considered to have bad image quality and it can be reprocessed by a PC or recognition software with a higher function of the monitoring center 204 when it is recorded in the external image storage medium 203.

On the other hand, when an effective candidate character string could be detected, it is checked whether or not the noted candidate character string exists as a candidate character string in the recognition result of the newest image (step S707), and the result is determined in step S708. When the noted candidate character string exists as a candidate character string in the recognition result of the newest image, the processing for the noted character string ends, and the process proceeds to the processing of the next character string. When the noted candidate character string does not exist as a candidate character string in the recognition result of the newest image, it is determined whether or not there is a next candidate character string in step S710. If a candidate character string to be checked still remains, the process returns to step S703. When all candidate character strings have been checked, it can be concluded that the noted character string is not included in the newest image. Accordingly, it can be seen that the images with the noted character string are up to the second newest image. Therefore, it goes back to the past to search for an image with the best state for the noted character string, and it is notified to the image output control section 218 (step S709).

Moreover, although the average value of the evaluation values of first candidate character codes of characters is used as the evaluation value of a candidate character string herein, uniformity of the character size and the like may also be added. Now, when the effective candidate character string "888" for the character string (L2) is noted, the evaluation value in the second newest image (Pa2) becomes 27 (20+22+40)/3≅27). Since the effective candidate character string "888" does not exist in the newest image (Pa3), processing of step S709 is performed for the effective candidate character string "888".

When the character string (L3) is noted, none of all the effective candidate character strings "1234", "1284", "-234", and "-284" exist in the newest image (Pa3), the processing of step S709 is performed similar to the effective candidate character string "888" of the character string (L2). Since the detected character strings are the above, one-time processing of the recognition result evaluating section 217 ends.

Figure 24:
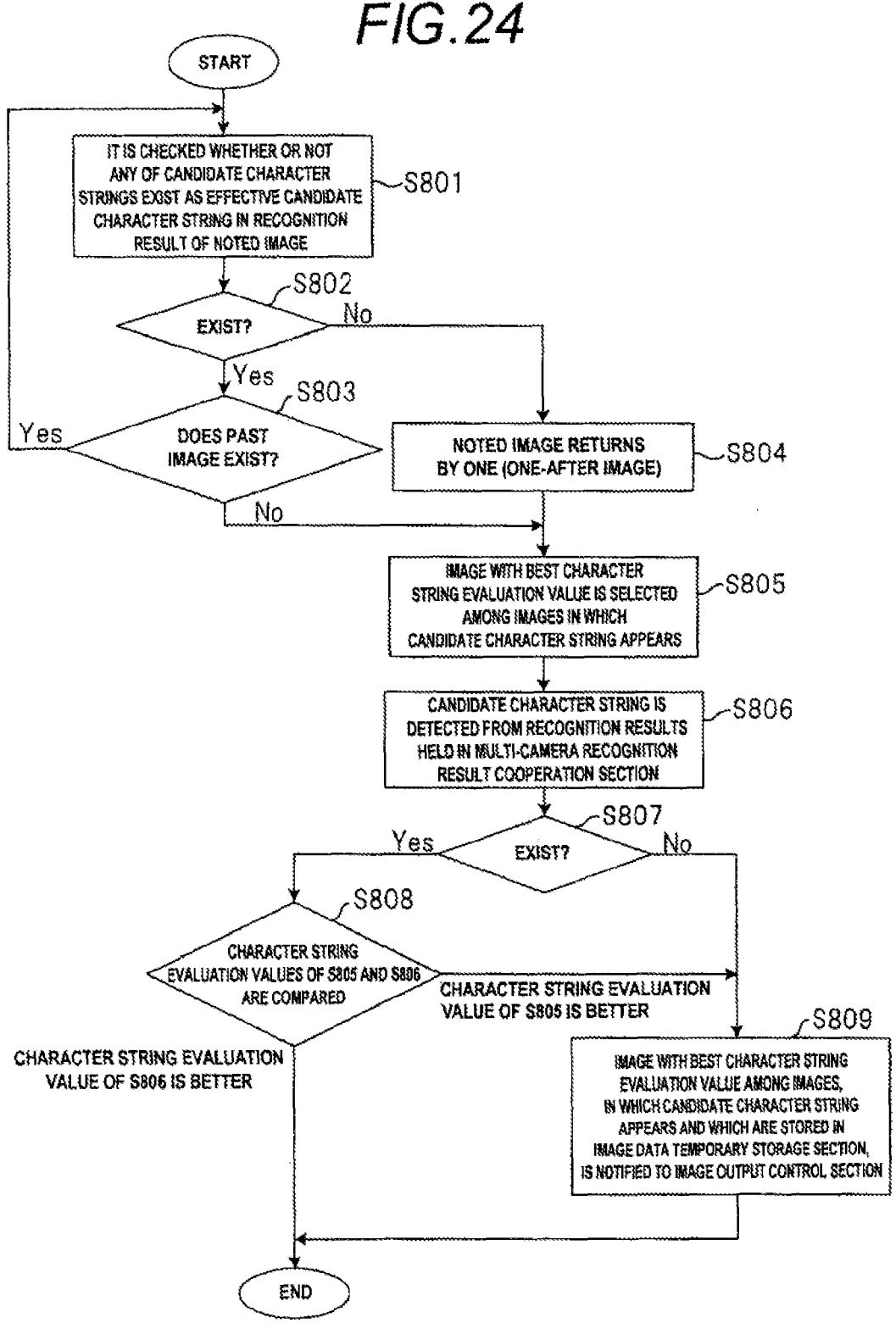
FIG. 24 is a flow chart showing detailed processing of step S710 in FIG. 23.

FIG. 24 is a schematic view of the processing of step S709 shown in FIG. 23. In this drawing, it is checked whether or not a candidate character string of the noted character string exists in noted images before the second newest image (steps S801 to S804). When an image in which no candidate character string exists is found or when a previous recognition result is not stored in the recognition result storage section 215, the oldest image in which the noted character string exists can be specified. Then, the evaluation value of a candidate character string in each image, in which any candidate character string exists, is calculated and an image with the best evaluation value is selected (step S805).

In the case of FIG. 22, the image in which the character string (L2) exists is only (Pa2). Accordingly, the evaluation value in each image for the character string (L2) is image (Pa2)→candidate character string "888"→evaluation value 27, and the image (Pa2) of the evaluation value 27 is selected for the character string (L2).

On the other hand, the images in which the character string (L3) exists are (Pa1) and (Pa2). Accordingly, the evaluation value in each image for the character string (L3) is as follows.

image (Pa1)→candidate character string "1234"→evaluation value 28 ((25+20+35+30)/4≈28)

image (Pa1)→candidate character string "1284"→evaluation value 29 ((25+20+40+30)/4≅29)

image (Pa2)→candidate character string "1234"→evaluation value 9 ((5+5+15+10)/4≅9)

image (Pa2)→candidate character string "1284"→evaluation value 15 ((5+5+40+10)/4=15)

image (Pa2)→candidate character string "-234"→evaluation value 15 ((30+5+15+10)/4=15)

image (Pa2)→candidate character string "-284"→evaluation value 21 ((30+5+40+10)/4≅21)

Regarding the character string (L3), the image (Pa2) with the evaluation value 9 is selected.

FIG. 25 is an explanatory view of the data stored in the multi-camera recognition result cooperation section 216. In this drawing, in the case where there are other image processing apparatuses 201 connected through the network 202, the supplementary information and recognition results of images are notified to all image processing apparatuses 201 connected through the network 202 when the other image processing apparatus 201 record images in the external image storage medium 203. The notified supplementary information and recognition result are stored in the multi-camera recognition result cooperation section 216 of each image processing apparatus 201.

In step S806 of FIG. 24, it is checked whether or not any of the candidate character strings exists as an effective candidate character string in the recognition result which is obtained in the other image recognition apparatuses 201 and is held in the multi-camera recognition result cooperation section 216. It is determined whether or not the result exists in step S807. When any of the candidate character strings exists as an effective candidate character string in the recognition result obtained in the other image recognition apparatuses 201, the evaluation value obtained in step S805 is compared with the evaluation value obtained in step S806. If the evaluation value obtained in step S805 is better, the image is notified to the image output control section 218. Nothing is done if the evaluation value obtained in step S806 is better.

In the case of FIG. 25, image (Pc1)→candidate character string "888"→evaluation value 30 ((20+30+40/3=30)), image (Pc1)→candidate character string "1234"→evaluation value 20 ((5+20+25+30)/4=20) are obtained. Since all of them are worse than the evaluation value obtained in step S805, image (Pa2)→candidate character string "888"→evaluation value 27 and image (Pa2)→candidate character string "1234"→evaluation value 9 which are obtained in step S805 are notified to the image output control section 218.

Moreover, when the recognition result of other image processing apparatuses 201 obtained in step S806 is selected, the determination is not performed only with the evaluation value but a time limitation or a limitation that a candidate character string should be equal in all character strings of the same character region may be added in order to avoid accidental matching of the recognition result.

The image output control section 218 reads, for the image notified from the recognition result evaluating section 217, the image and the supplementary information from the image data temporary storage section 211 and reads the recognition result from the recognition result storage section 215 and records them in the external image storage medium 203 through the network 202. In addition, the image notified from the recognition result evaluating section 217 is not necessarily one. In addition, when they are designated in a plural number, the same image may be designated. However, the repetition is resolved in the image output control section 218 and the same image is recorded only once. In addition, a recording completion flag of the storage section 211 is set for the image recorded once.

The image output control section 218 records an image, supplementary information, and a recognition result in the external image storage medium 203 and notifies the supplementary information and the recognition result to all image processing apparatuses 201 connected through the network 202. The notified supplementary information and recognition result are stored in the multi-camera recognition result cooperation section 216 of each image processing apparatus 201.

Figure 26:
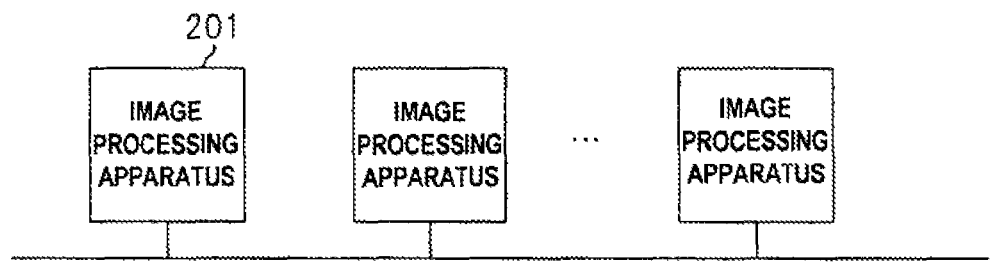
FIG. 26 is a block diagram showing the first configuration in which a plurality of image processing apparatuses of FIG. 14 is used and connected through a network.

FIG. 26 is a block diagram showing the first configuration in which the plurality of image processing apparatuses 201 is connected through the network 202. In this configuration, by holding the recognition result obtained in the other image processing apparatuses 201 in the multi-camera recognition result cooperation section 216 provided in each image processing apparatus 201, it is possible to prevent images from being repeatedly recorded in the external image storage medium 203 when the identical object is photographed by a plurality of cameras.

Figure 27:
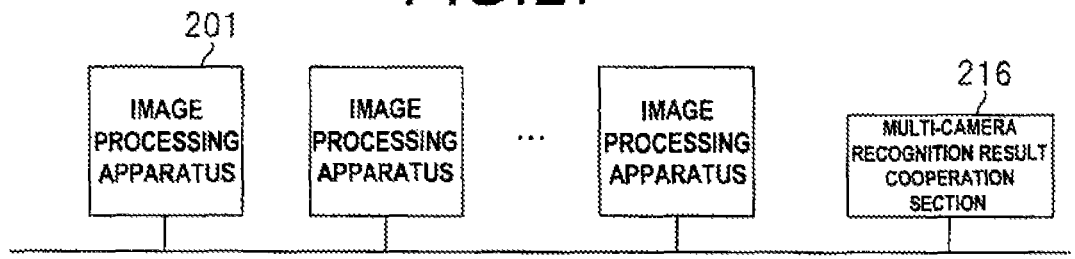
FIG. 27 is a block diagram showing the second configuration in which a plurality of image processing apparatuses of FIG. 14 is used and connected through a network.
Figure 28:
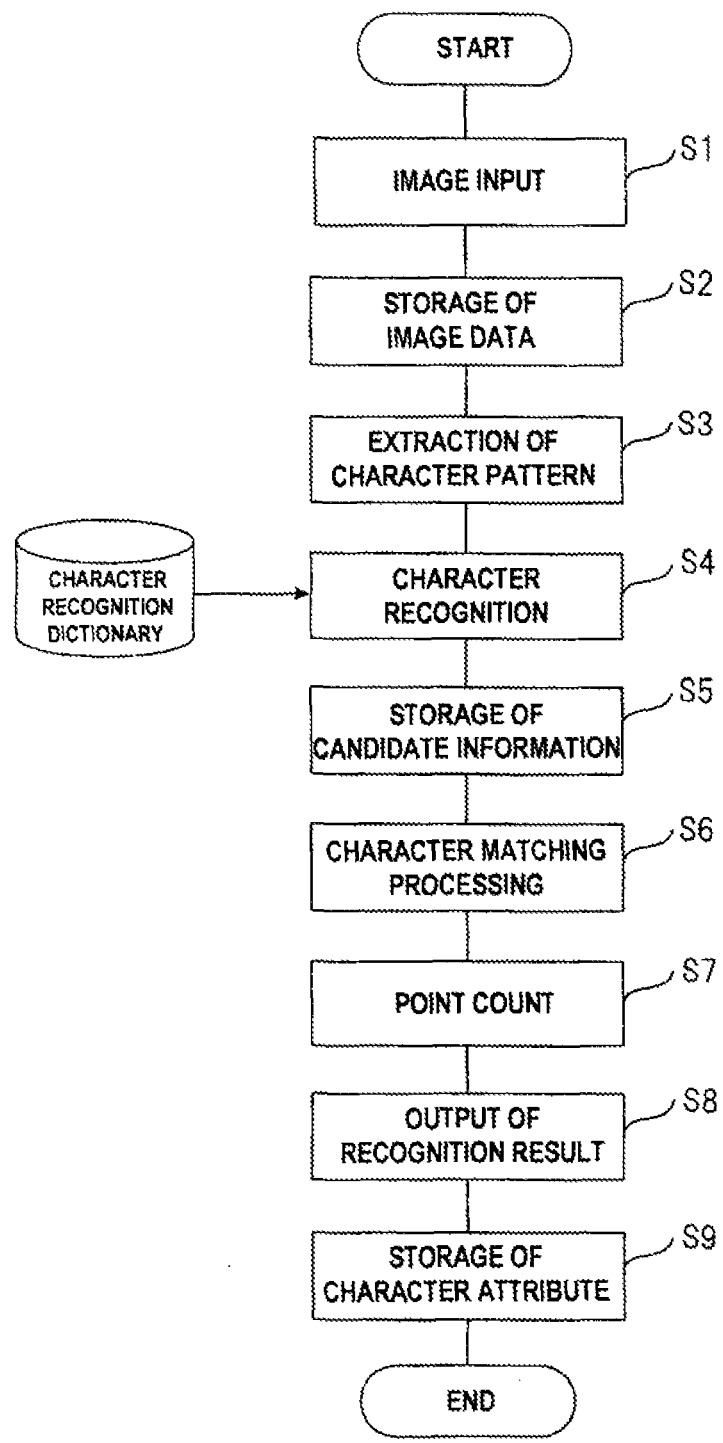
FIG. 28 is a flow chart showing the details of control in a known pattern recognition method.
Figure 29:
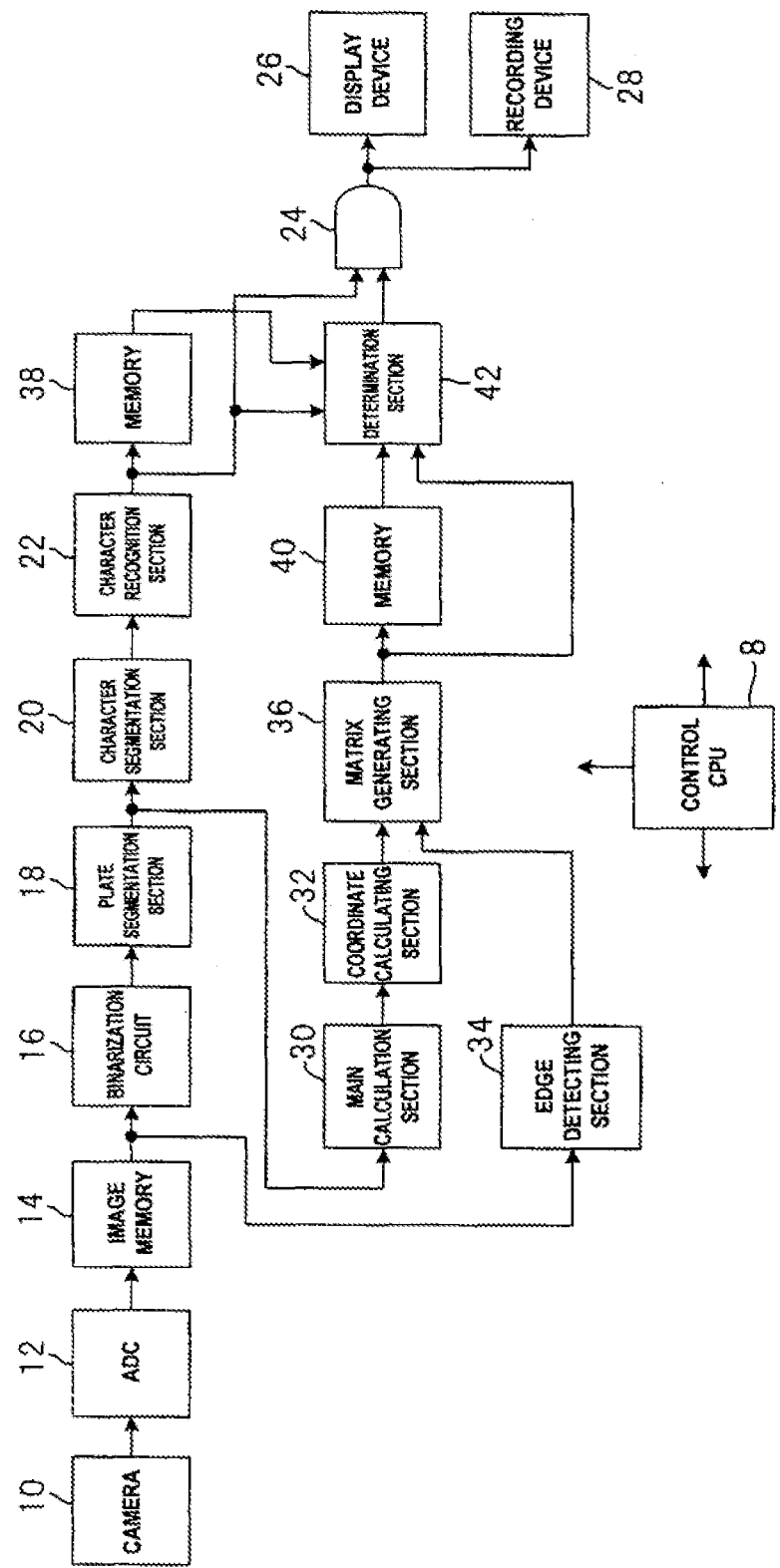
FIG. 29 is a block diagram showing the schematic configuration of a known image processing apparatus.

FIG. 27 is a block diagram showing the second configuration in which the plurality of image processing apparatuses 201 is connected through the network 202. In this configuration, the multi-camera recognition result cooperation section 216 is not provided in each image processing apparatus 201, but the single multi-camera recognition result cooperation section 216 is provided for the plurality of image processing apparatuses 201. Also in this configuration, by holding the recognition result obtained in the other image processing apparatuses 201 in the multi-camera recognition result cooperation section 216, it is possible to prevent images from being repeatedly recorded in the external image storage medium 203 when the identical object is photographed by a plurality of cameras.

In addition, since a recognition result indicating the contents of an image is given to the image recorded in the external image storage medium 203, it becomes easy to search an image in the external image storage medium 203 with a PC or the like of the monitoring center 204. In addition, since the character region coordinates and the character coordinates are given, only a specific region may be processed when an image in the external image storage medium 203 is reprocessed by a PC or the like of the monitoring center 204. Accordingly, a significant improvement in processing efficiency can be realized.

Thus, according to the image processing apparatus 201 of the present embodiment, a plurality of images and supplementary information are stored in the image data temporary storage section 211, the character recognition section 214 performs character recognition in an image, a recognition result corresponding to a plurality of images held in the image data temporary storage section 211 is held in the recognition result storage section 215, the recognition result evaluating section 217 detects the timing of a change in image contents, and the image of the image data temporary storage section 211 is recorded in the external image storage medium 203 only when there has been a change in image contents. Accordingly, since the change in image contents can be detected for an image of a person which wears a name card or an image in which the entire number plate does not always appear, the external image storage medium 203 can be effectively used.

In addition, since the change in image contents can be detected without being limited to the number plate image, it is easy to install a camera. In addition, since the image input section 210 may be a movable camera, a broad range can be monitored with a small number of cameras. Since an image having significant information among a large number of images input from the image input section 210 can be selected and recorded, the external image storage medium 203 can be effectively used. In addition, in the configuration where a plurality of cameras is connected through the network 202, the identity can also be determined when the identical object is photographed by a plurality of cameras. Accordingly, it is possible to prevent images from being repeatedly recorded in the external image storage medium 203. In addition, since a recognition result indicating the contents of an image is given when recording the image in the external image storage medium 203, it becomes easy to search for a specific image from a large number of stored images with a PC or the like of the monitoring center. In addition, the character region coordinates and the character coordinates are included in the recognition result given. Accordingly, the processing accuracy can be improved and a significant improvement in processing efficiency can be realized by reprocessing only a character region using the character region coordinates and the character coordinates included in the recognition result given to the image when second processing of an image recorded in the external image storage medium 203 is performed by a PC or the like of the monitoring center.

Moreover, in the present embodiment, an image and its supplementary information and recognition result are recorded together when recording the information in the external image storage medium 203. However, in the case where it is not essential to record an image, only the supplementary information and the recognition result excluding the image may be recorded as long as the evaluation value is good enough. In this way, the amount of use of the external image storage medium 203 can be further reduced.

In addition, although a pattern, which is photographed simultaneously with an object and indicates the object, is set as a character string in the present embodiment, a pattern with the same characteristic as a character, such as a logo, a mark, or a face, may also be used. The various conditions or threshold values in each processing are not limited if they are the same criteria. In addition, each functional block, such as the image input section 210, the image data temporary storage section 211, the binarization section 212, the character region extracting section 213, the character recognition section 214, the recognition result storage section 215, the multi-camera recognition result cooperation section 216, the recognition result evaluating section 217, and the image output control section 218, may be typically realized as an LSI which is an integrated circuit. The technique of circuit integration is not limited to the LSI. Each of them may be individually made as one chip, or they may be made as one chip so as to include some or all sections.

In addition, in the present embodiment, each processing step in each operation described above may be described in a computer executable program.

The present invention has been explained in detail with reference to the particular embodiments. However, it is obvious for those skilled in the art that various variations and modifications can be applied without departing from the spirit and the scope of the present invention.

This application is based upon and claims the benefits of priorities of Japanese Patent Applications No. 2008-152749 filed on Jun. 11, 2008 and No. 2008-181733 filed on Jul. 11, 2008, the contents of which are incorporated herein by reference in its entirety.

INDUSTRIAL APPLICABILITY

The present invention has an effect that even when there exists a plurality of images with different positions or zes of character patterns indicating the identical object, they can be treated as character patterns indicating the identical object. Accordingly, the present invention is useful as a pattern recognition apparatus and a pattern recognition method used to analyze a change of a recorded object using the character information, which is simultaneously recorded, on the basis of a plurality of images, in which objects which may change are recorded, like the case where cars are automatically monitored on the basis of moving images obtained by photographing various cars moving on the road, for example. In addition, the present invention has an effect that an object is not limited to a number plate and an image with significant information can be selectively recorded. Accordingly, the present invention may be applied to a monitoring system and the like.

DESCRIPTION OF REFERENCE NUMERALS AND SIGNS

101: image input section
102: image data storage section
103: character recognition section
104: character recognition result storage section
105: designation section
106: analysis section
107: result output section
201: image processing apparatus
202: network
203: external image storage medium
204: monitoring center
210: image input section
211: image data temporary storage section
212: binarization section
213: character region extracting section
214: character recognition section
215: recognition result storage section
216: multi-camera recognition result cooperation section
217: recognition result evaluating section
218: image output control section

The invention claimed is:

1. An image processing apparatus comprising:
an image input means for continuously inputting an image;
an image temporary storage means for temporarily storing the image input in the image input means;
a character extraction means for extracting a character from the image stored in the image temporary storage means;
a character recognition means for recognizing the character extracted in the character extraction means to thereby obtain as a recognition result one or more of candidate characters for the recognized character and each evaluation value;
a recognition result storage means for storing the recognition result obtained in the character recognition means; and
a recognition result evaluation means for determining whether to output the image which is stored in the image temporary storage means, on the basis of the recognition result stored in the recognition result storage means
the recognition result evaluation means checks the recognition results of the characters of a plurality of images stored in the image temporary storage means and selects the image with the best evaluation value for the recognition result when an identical character string is included in the recognition results of the plurality of images.

2. The image processing apparatus according to claim 1, further comprising an image output control means for outputting the image determined to be output in the recognition result evaluation means;
wherein the recognition result evaluation means checks the recognition results of the characters of the plurality of images stored in the image temporary storage means, and when the evaluation values are bad for recognition results of all characters even though characters are included in one image, notifies a corresponding effect to the image output control means, and the image output control means outputs the image notified from the recognition result evaluation means together with supplementary information of the image and the recognition result.

3. The image processing apparatus according to claim 2 further comprising
a multi-camera recognition result cooperation means for storing a recognition result of characters in an image and supplementary information of the image used to obtain the recognition result, which are an output of another image processing apparatus connected through a network,
wherein the image input means inputting a supplementary information related to the image with the image,
the recognition result storage means storing the supplementary information related to the image with the image,
the recognition result evaluation means checks the recognition result stored in the recognition result storage means and the recognition result stored in the multi-camera recognition result cooperation means, and notifies the image output control means that the image is not output when the identical character string is included in both the recognition results and the supplementary information of the image and the evaluation values of the recognition results satisfy predetermined conditions; and notifies the image output control means that the image is output when a character string included in the recognition result stored in the recognition result storage means is not included in the recognition result stored in the multi-camera recognition result cooperation means or when the supplementary information of the image and the evaluation values of the recognition results do not satisfy the predetermined conditions even if a character string included in the recognition result stored in the recognition result storage means is included in the recognition result stored in the multi-camera recognition result cooperation means, and
the image output control means outputs the image, the supplementary information of the image, and the recognition result to the network when it is notified from the recognition result evaluation means that the image is output.

4. An image processing method comprising:
an image input process of continuously inputting an image;
an image temporary storage process of temporarily storing the image input in the image input process;
a character extraction process of extracting a character from the image stored in the image temporary storage process;
a character recognition process of recognizing the character extracted in the character extraction process to thereby obtain as a recognition result one or more of candidate characters for the recognized character and each evaluation value;
a recognition result storage process of storing the recognition result obtained in the character recognition process; and
a recognition result evaluation process of determining whether to output the image, which is stored in the image temporary storage process, on the basis of the recognition result stored in the recognition result storage process;
in the recognition result evaluation process, the recognition results of the characters of a plurality of images stored in the image temporary storage process are checked and the image with the best evaluation value for the recognition result is selected when an identical character string is included in the recognition results of the plurality of images.

5. A non-transitory storage medium for recording an image processing program causing a computer to execute:
an image input step of continuously inputting an image;
an image temporary storage step of temporarily storing the image input in the image input step;
a character extraction step of extracting a character from the image stored in the image temporary storage step;
a character recognition step of recognizing the character extracted in the character extraction step to thereby obtain as a recognition result one or more of candidate characters for the recognized character and each evaluation value;
a recognition result storage step of storing the recognition result obtained in the character recognition step; and
a recognition result evaluation step of determining whether to output the image, which is stored in the image temporary storage step, on the basis of the recognition result stored in the recognition result storage step;
in the recognition result evaluation step, the recognition results of the characters of a plurality of images stored in the image temporary storage step are checked and the image with the best evaluation value for the recognition result is selected when an identical character string is included in the recognition results of the plurality of images.

* * * * *